(12) United States Patent
Chauhan et al.

(10) Patent No.: US 11,327,881 B2
(45) Date of Patent: May 10, 2022

(54) TECHNOLOGIES FOR COLUMN-BASED DATA LAYOUTS FOR CLUSTERED DATA SYSTEMS

(71) Applicant: Intel Corporation, Santa Clara, CA (US)

(72) Inventors: Chetan Chauhan, Folsom, CA (US); Sourabh Dongaonkar, Santa Clara, CA (US); Rajesh Sundaram, Folsom, CA (US); Jawad Khan, Portland, OR (US); Sandeep Guliani, Folsom, CA (US); Dipanjan Sengupta, Hillsboro, OR (US); Mariano Tepper, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 61 days.

(21) Appl. No.: 15/930,889

(22) Filed: May 13, 2020

(65) Prior Publication Data

US 2020/0301825 A1 Sep. 24, 2020

(51) Int. Cl.
*G06F 12/02* (2006.01)
*G06F 16/27* (2019.01)

(52) U.S. Cl.
CPC ........ *G06F 12/0207* (2013.01); *G06F 16/278* (2019.01)

(58) Field of Classification Search
CPC .. G06F 12/0207; G06F 16/278; G06F 16/221; G06F 2212/1016; G06F 2212/163; G06F 12/0292
See application file for complete search history.

(56) References Cited

U.S. PATENT DOCUMENTS

| 2016/0202983 | A1* | 7/2016 | Lin | G06F 9/3802 |
| | | | | 712/225 |
| 2019/0042401 | A1* | 2/2019 | Khan | G06F 3/0683 |
| 2019/0146717 | A1* | 5/2019 | Khan | G06F 3/0659 |
| | | | | 711/154 |
| 2020/0301825 | A1* | 9/2020 | Chauhan | G06F 16/278 |
| 2020/0301828 | A1* | 9/2020 | Khan | G06F 13/4027 |

* cited by examiner

Primary Examiner — Sean D Rossiter
(74) Attorney, Agent, or Firm — Compass IP Law PC

(57) ABSTRACT

Technologies for media management for providing column data layouts for clustered data include a device having a column-addressable memory and circuitry connected to the memory. The circuitry is configured to store a data cluster of a logical matrix in the column-addressable memory with a column-based format and to read a logical column of the data cluster from the column-addressable memory with a column read operation. Reading the logical column may include reading logical column data diagonally from the column-address memory, including reading from the data cluster and a duplicate copy of the data cluster. Reading the logical column may include reading from multiple complementary logical columns. Reading the logical column may include reading logical column data diagonally with a modulo counter. The column data may bread from a partition of the column-address memory selected based on the logical column number. Other embodiments are described and claimed.

24 Claims, 12 Drawing Sheets

FIG. 9

TECHNOLOGIES FOR COLUMN-BASED DATA LAYOUTS FOR CLUSTERED DATA SYSTEMS

BACKGROUND

Content-based similarity search, or simply similarity search, is a key technique that underpins machine learning (ML) and artificial intelligence applications (AI). In performing a similarity search, query data, such as data indicative of an object (e.g., an image) is used to search a database to identify data indicative of similar objects (e.g., similar images). However, the sheer volume and richness of data used in large-scale similarity searches is an extremely challenging problem that is both compute and memory intensive. In some systems, hashing methods are used to perform stochastic associative searches faster than may otherwise be possible. However, hashing methods typically provide an imperfect conversion of data from one space (e.g., domain) to another space (e.g., domain) and may yield search results that are degraded (e.g. in terms of accuracy) as compared to searches using the original space of the data to be searched.

Given the size of modern databases (on the order of billions of entries), the search speed of stochastic associative memories may not cope with current throughput demands (in the order of tens or hundreds of thousands of searches per second). To improve effective search speed, the database may be partitioned into clusters. Each cluster has an associated representative. A search query is compared against all cluster representatives and then a subset of the database is explored. Exploring the database may include taking the union of database entries in the selected clusters and retrieving the most similar elements in this set.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIGS. 8 and 9 are a schematic diagram illustrating a memory layout of clustered data that may be accessed with the method of FIG. 7;

DETAILED DESCRIPTION OF THE DRAWINGS

Figure 1:
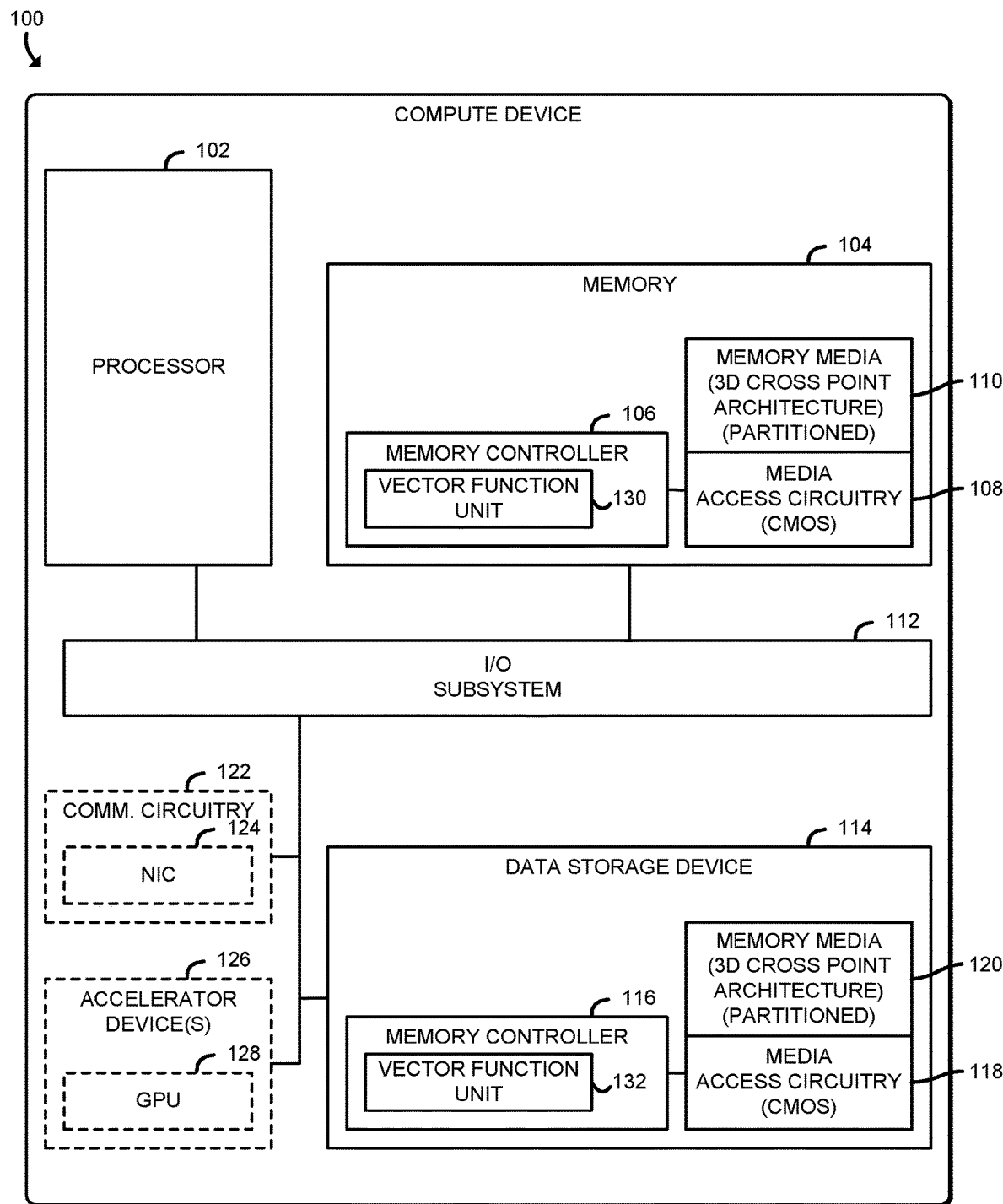
FIG. 1 is a simplified diagram of at least one embodiment of a compute device for providing column data layouts for clustered data using column-read enabled memory.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a compute device 100 for providing column data layouts for clustered data using column-read enabled memory includes a processor 102, a memory 104, an input/output (I/O) subsystem 112, a data storage device 114, communication circuitry 122, and one or more accelerator devices 126. Of course, in other embodiments, the compute device 100 may include other or additional components, such as those commonly found in a computer (e.g., a display, peripheral devices, etc.). Additionally, in some embodiments, one or more of the illustrative components may be incorporated in, or otherwise form a portion of, another component. The term "memory," as used herein in reference to performing media management may refer to the memory 104 and/or the data storage device 114, unless otherwise specified. As explained in more detail herein, media access circuitry 108, 118 (e.g., any circuitry or device configured to access and operate on data in the corresponding memory media 110, 120) connected a corresponding memory media 110, 120 (e.g., any device or material that data is written to and read from) may provide (e.g., read and/or write) various column data layouts for clustered data. As described further below, column data layouts may include duplicated data clusters as described in connection with FIGS. 5-6, complimentary logical columns as described in connection with FIGS. 7-9, per-die rotations in multiple partitions as described in connection with FIGS. 10-11, and/or per-die rotations with preserved row read performance as described in connection with FIGS. 12-13. The column data layouts disclosed herein may improve read performance by reducing the total number of required column read operations, for example by avoiding multiple reads on cluster edges, avoiding modulo penalties or otherwise reducing reads.

The memory media 110, in the illustrative embodiment, has a three dimensional cross point architecture that has data access characteristics that differ from other memory architectures (e.g., dynamic random access memory (DRAM)), such as enabling access to one bit per tile and incurring time delays between reads or writes to the same partition or other partitions. The media access circuitry 108 is configured to make efficient use (e.g., in terms of power usage and speed) of the architecture of the memory media 110, such as by accessing multiple tiles in parallel within a given partition, utilizing scratch pads (e.g., relatively small, low latency memory) to temporarily retain and operate on data read from the memory media 110, and broadcasting data read from one partition to other portions of the memory 104 to enable matrix calculations (e.g., tensor operations) to be performed in parallel within the memory 104. Additionally, in the illustrative embodiment, instead of sending read or write requests to the memory 104 to access matrix data, the processor 102 may send a higher-level request (e.g., a request for a macro operation, a top n similarity search query request, or other stochastic associative search request) and provide the locations of the input data to be utilized in the requested operation (e.g., an input query). Further, rather than sending back the resulting data to the processor 102, the memory 104 may merely send back an acknowledgement or other indication of status (e.g., "Done"), indicating that the requested operation has been completed. As such, many compute operations, such as artificial intelligence operations (e.g., stochastic associative searches) can be performed in memory (e.g., in the memory 104 or in the data storage device 114), with minimal usage of the bus (e.g., the I/O subsystem 112) to transfer data between components of the compute device 100 (e.g., between the memory 104 or data storage device 114 and the processor 102).

In some embodiments the media access circuitry 108 is included in the same die as the memory media 110. In other embodiments, the media access circuitry 108 is on a separate die but in the same package as the memory media 110. In yet other embodiments, the media access circuitry 108 is in a separate die and separate package but on the same dual in-line memory module (DIMM) or board as the memory media 110.

The processor 102 may be embodied as any device or circuitry (e.g., a multi-core processor(s), a microcontroller, or other processor or processing/controlling circuit) capable of performing operations described herein, such as executing an application (e.g., an artificial intelligence related application that may utilize a neural network or other machine learning structure to learn and make inferences). In some embodiments, the processor 102 may be embodied as, include, or be coupled to an FPGA, an application specific integrated circuit (ASIC), reconfigurable hardware or hardware circuitry, or other specialized hardware to facilitate performance of the functions described herein.

The memory 104, which may include a non-volatile memory (e.g., a far memory in a two-level memory scheme), includes the memory media 110 and the media access circuitry 108 (e.g., a device or circuitry, such as a processor, application specific integrated circuitry (ASIC), or other integrated circuitry constructed from complementary metal-oxide-semiconductors (CMOS) or other materials) underneath (e.g., at a lower location) and coupled to the memory media 110. The media access circuitry 108 is also connected to the memory controller 106, which may be embodied as any device or circuitry (e.g., a processor, a co-processor, dedicated circuitry, etc.) configured to selectively read from and/or write to the memory media 110 in response to corresponding requests (e.g., from the processor 102 which may be executing an artificial intelligence related application that relies on stochastic associative searches to recognize objects, make inferences, and/or perform related artificial intelligence operations). In some embodiments, the memory controller 106 may include a vector function unit (VFU) 130 which may be embodied as any device or circuitry (e.g., dedicated circuitry, reconfigurable circuitry, an application specific integrated circuit (ASIC), a field programmable gate array (FPGA), etc.) capable of offloading vector-based tasks from the processor 102 (e.g., comparing data read from specific columns of vectors stored in the memory media 110, determining Hamming distances between the vectors stored in the memory media 110 and a search key, sorting the vectors according to their Hamming distances, etc.).

Figure 2:
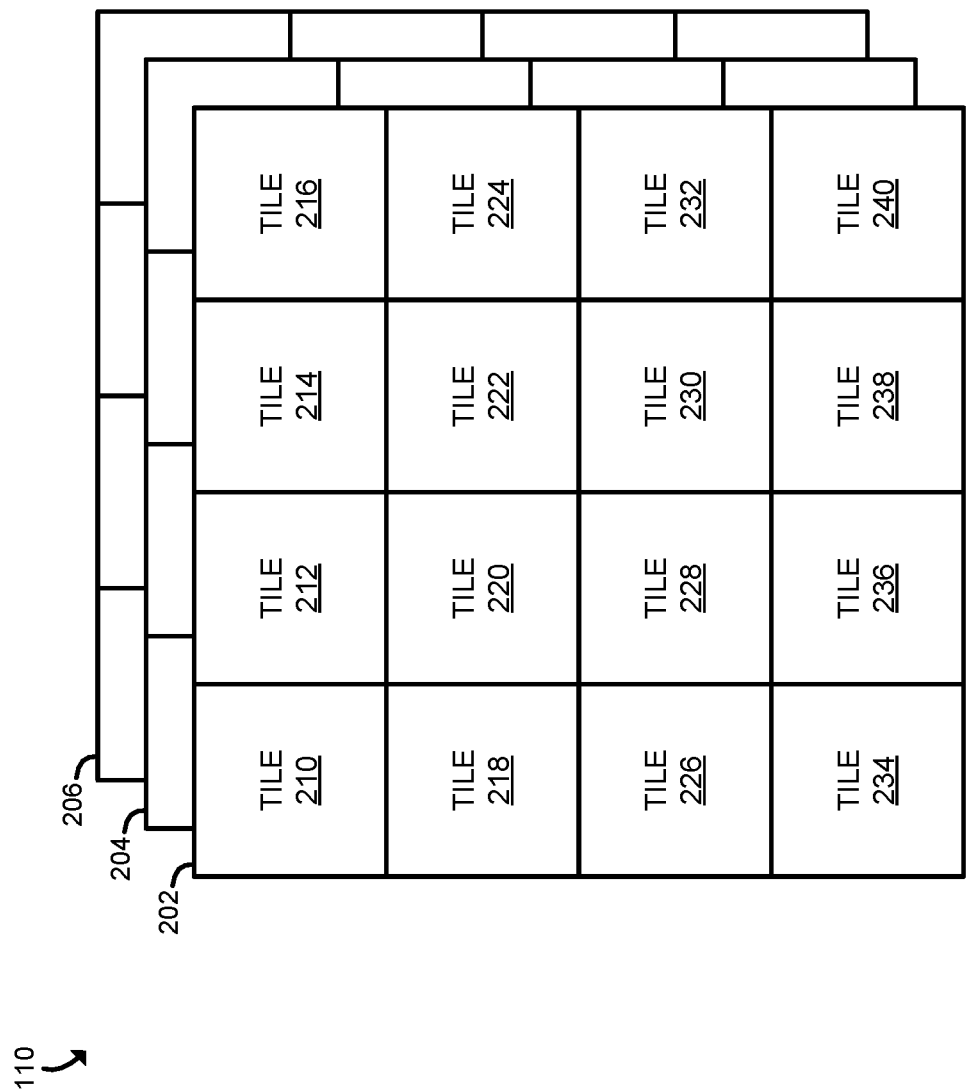
FIG. 2 is a simplified diagram of at least one embodiment of a memory media included in the compute device of FIG. 1.

Referring briefly to FIG. 2, the memory media 110, in the illustrative embodiment, includes a tile architecture, also referred to herein as a cross point architecture (e.g., an architecture in which memory cells sit at the intersection of word lines and bit lines and are individually addressable and in which bit storage is based on a change in bulk resistance), in which each memory cell (e.g., tile) 210, 212, 214, 216, 218, 220, 222, 224, 226, 228, 230, 232, 234, 236, 238, 240 is addressable by an x parameter and a y parameter (e.g., a column and a row). The memory media 110 includes multiple partitions, each of which includes the tile architecture. The partitions may be stacked as layers 202, 204, 206 to form a three dimensional cross point architecture (e.g., Intel 3D XPoint™ memory). Unlike typical memory devices, in which only fixed-size multiple-bit data structures (e.g., byte, words, etc.) are addressable, the media access circuitry 108 is configured to read individual bits, or other units of data, from the memory media 110 at the request of the memory controller 106, which may produce the request in response to receiving a corresponding request from the processor 102.

Referring back to FIG. 1, the memory 104 may include non-volatile memory and volatile memory. The non-volatile memory may be embodied as any type of data storage capable of storing data in a persistent manner (even if power is interrupted to the non-volatile memory). For example, the non-volatile memory may be embodied as one or more non-volatile memory devices. The non-volatile memory devices may include one or more memory devices configured in a cross point architecture that enables bit-level addressability (e.g., the ability to read from and/or write to individual bits of data, rather than bytes or other larger units of data), and are illustratively embodied as three dimensional (3D) cross point memory. In some embodiments, the non-volatile memory may additionally include other types of memory, including any combination of memory devices that use chalcogenide phase change material (e.g., chalcogenide glass), ferroelectric transistor random-access memory (FeTRAM), nanowire-based non-volatile memory, phase change memory (PCM), memory that incorporates memristor technology, Magnetoresistive random-access memory (MRAM) or Spin Transfer Torque (STT)-MRAM. The volatile memory may be embodied as any type of data storage capable of storing data while power is supplied volatile memory. For example, the volatile memory may be embodied as one or more volatile memory devices, and is periodically referred to hereinafter as volatile memory with the understanding that the volatile memory may be embodied as other types of non-persistent data storage in other embodiments. The volatile memory may have an architecture that enables bit-level addressability, similar to the architecture described above.

The processor 102 and the memory 104 are communicatively coupled to other components of the compute device 100 via the I/O subsystem 112, which may be embodied as circuitry and/or components to facilitate input/output operations with the processor 102 and/or the main memory 104 and other components of the compute device 100. For example, the I/O subsystem 112 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 112 may form a portion of a system-on-a-chip (SoC) and be incorporated, along with one or more of the processor 102, the main memory 104, and other components of the compute device 100, in a single chip.

The data storage device 114 may be embodied as any type of device configured for short-term or long-term storage of data such as, for example, memory devices and circuits, memory cards, hard disk drives, solid-state drives, or other data storage device. In the illustrative embodiment, the data storage device 114 includes a memory controller 116, similar to the memory controller 106, memory media 120 (also referred to as "storage media"), similar to the memory media 110, and media access circuitry 118, similar to the media access circuitry 108. Further, the memory controller 116 may also include a vector function unit (VFU) 132 similar to the vector function unit (VFU) 130. The data storage device 114 may include a system partition that stores data and firmware code for the data storage device 114 and one or more operating system partitions that store data files and executables for operating systems.

The communication circuitry 122 may be embodied as any communication circuit, device, or collection thereof, capable of enabling communications over a network between the compute device 100 and another device. The communication circuitry 122 may be configured to use any one or more communication technology (e.g., wired or wireless communications) and associated protocols (e.g., Ethernet, Bluetooth®, WiMAX, etc.) to effect such communication.

The illustrative communication circuitry 122 includes a network interface controller (NIC) 124, which may also be referred to as a host fabric interface (HFI). The NIC 124 may be embodied as one or more add-in-boards, daughter cards, network interface cards, controller chips, chipsets, or other devices that may be used by the compute device 100 to connect with another compute device. In some embodiments, the NIC 124 may be embodied as part of a system-on-a-chip (SoC) that includes one or more processors, or included on a multichip package that also contains one or more processors. In some embodiments, the NIC 124 may include a local processor (not shown) and/or a local memory (not shown) that are both local to the NIC 124. In such embodiments, the local processor of the NIC 124 may be capable of performing one or more of the functions of the processor 102. Additionally or alternatively, in such embodiments, the local memory of the NIC 124 may be integrated into one or more components of the compute device 100 at the board level, socket level, chip level, and/or other levels.

The one or more accelerator devices 126 may be embodied as any device(s) or circuitry capable of performing a set of operations faster than the general purpose processor 102. For example, the accelerator device(s) 126 may include a graphics processing unit 128, which may be embodied as any device or circuitry (e.g., a co-processor, an ASIC, reconfigurable circuitry, etc.) capable of performing graphics operations (e.g., matrix operations) faster than the processor 102.

Figure 3:
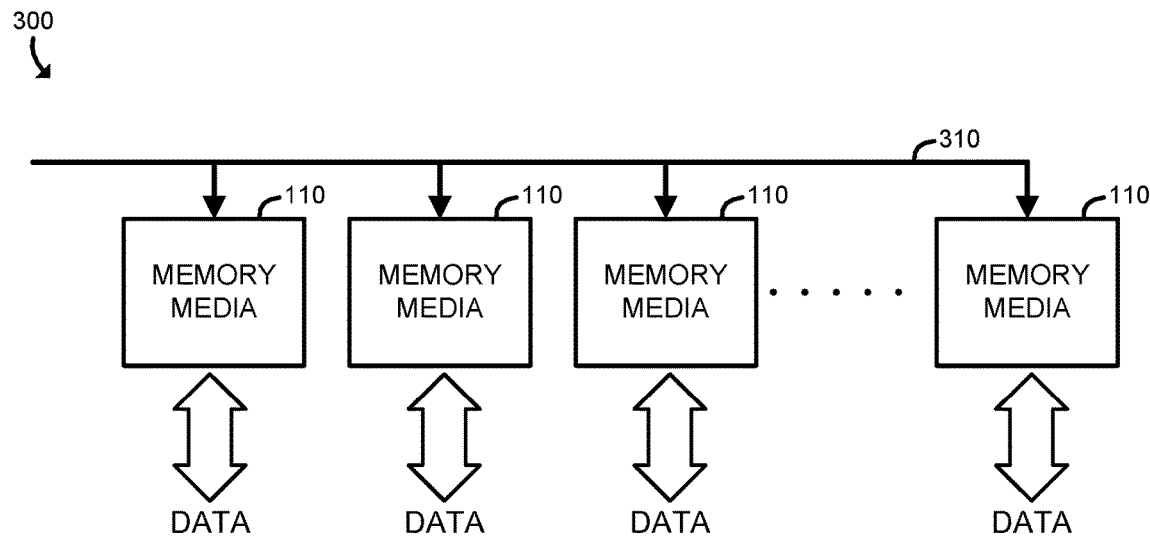
FIG. 3 is a simplified diagram of at least one embodiment of the memory media of the compute device of FIG. 1 in a dual in-line memory module (DIMM)

Referring now to FIG. 3, the compute device 100, in some embodiments, may utilize a dual in-line memory module (DIMM) architecture 300. In the architecture 300, multiple dies of the memory media 110 are connected with a shared command address bus 310. As such, in operation, data is read out in parallel across all of the memory media 110 connected to the shared command address bus 310. Data may be laid out across the memory media 110 in a configuration to allow reading the same column across all of the connected dies of the memory media 110.

Figure 4:
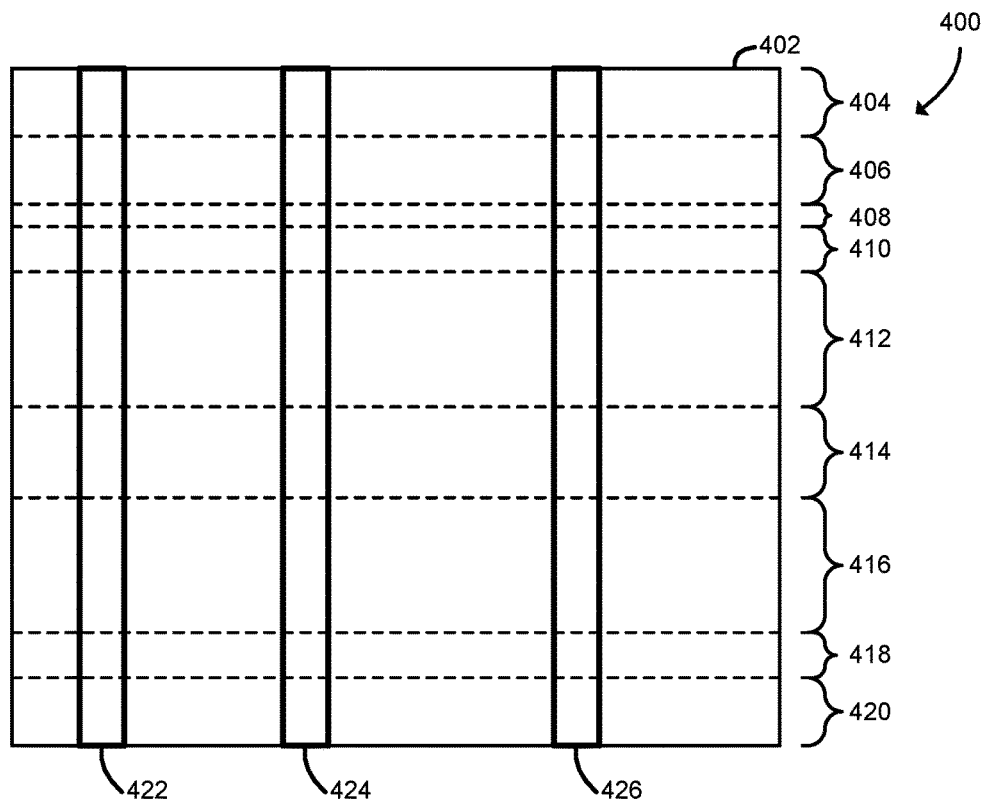
FIG. 4 is a simplified diagram of a clustered data set that may be processed by the compute device of FIGS. 1-3.

Referring now to FIG. 4, diagram 400 illustrates a clustered data set that may be accessed (e.g., read and/or written) by the compute device 100 in the memory 104 and/or the data storage device 114. The clustered data set is shown as a logical matrix 402, which includes data elements (e.g., bits) arranged in rows and columns. Rows of the matrix 402 are illustratively grouped into multiple clusters 404, 406, 408, 410, 412, 414, 416, 418, 420. Each cluster includes a contiguous group of rows, and each cluster may have a different length (i.e., number of rows). The rows of each cluster include data for each of the same columns; for example, columns 422, 424, 426 are illustrated extending through all of the clusters. An application may request a column read for column data included in a particular cluster or group of clusters. For example, a column read may be performed to retrieve data of the column 424 included in the cluster 414. It should be noted that the diagram 400 illustrates a logical view of the matrix 400, including a logical view of the rows and columns. As described further below, the rows and/or columns of the matrix 402 may be arranged in a different, column-based format when stored in the memory media 110, 120.

Figure 5:
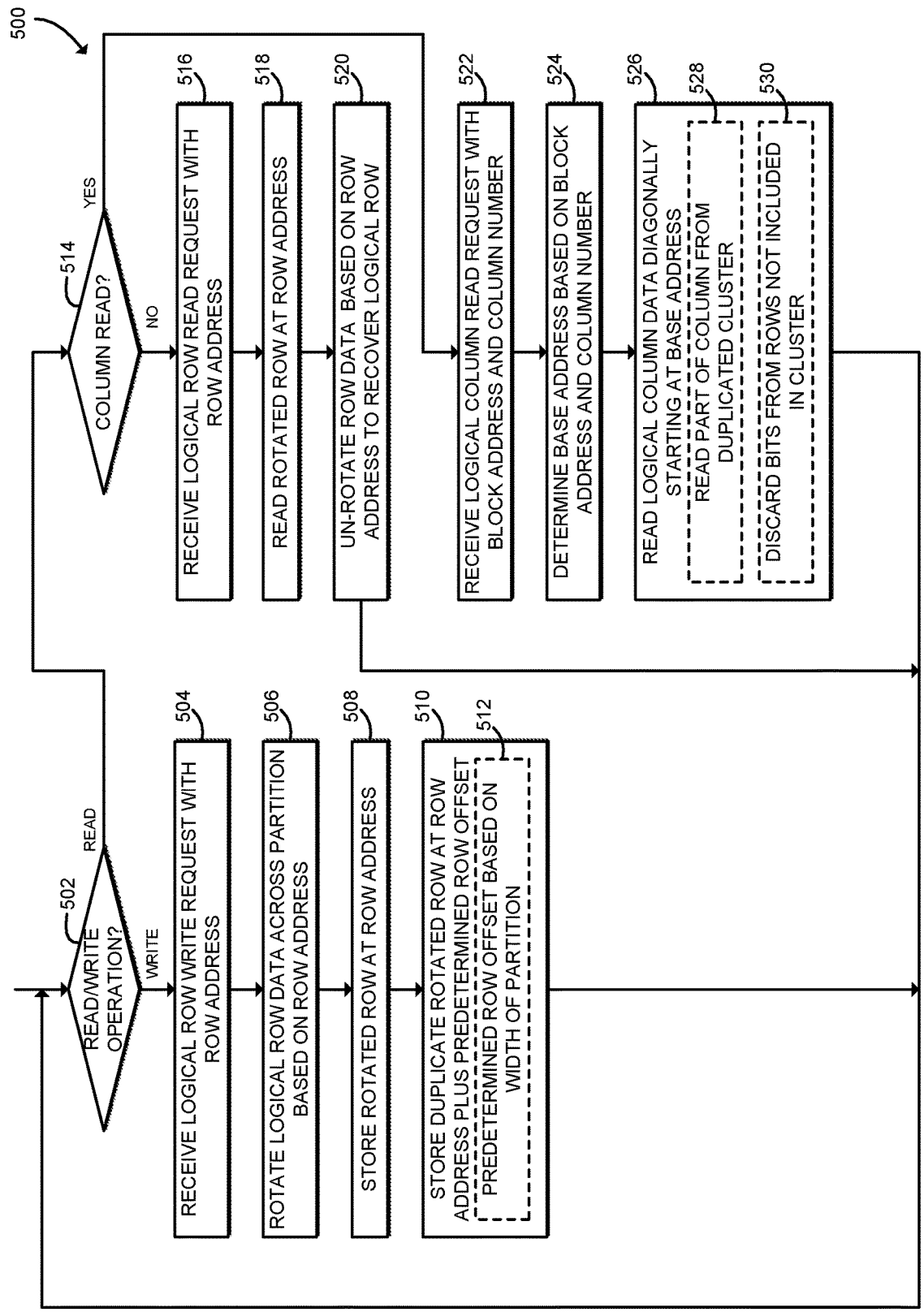
FIG. 5 is a simplified flow diagram of at least one embodiment of a method for clustered data access that may be performed by the compute device of FIG. 1.

Referring now to FIG. 5, the compute device 100, in operation, may execute a method 500 for clustered data access. The method 500 is described with reference to the memory 104. However, it should be understood that the method 500 could be performed additionally or alternatively using the data storage device 114. The method 500 begins with block 502 in which the compute device 100 (e.g., the media access circuitry 108) determines whether to perform a read operation or a write operation. If the compute device 100 determines to perform a read operation, the method 500 branches ahead to block 514, described below. If the compute device 100 determines to perform a write operation, the method 500 advances to block 504.

In block 504, the compute device 100 (e.g., the media access circuitry 108) receives a logical row write request. The logical row write request may include a row address and logical row data for storage in the memory 104. The logical row data may be a row of data included in a cluster. For example, the media access circuitry 108 may receive from the memory controller 106 a memory access request that originated from the host processor 102. In some embodiments, the memory access may be generated by the vector function unit 130 of the memory controller 106, for example in response to a macro command received from the host processor 102.

In block 506, the compute device 100 rotates the logical row data across a partition of the memory media 110. The amount of rotation may be determined by the row address. Illustratively, the compute device 100 rotates the logical row data by one column (i.e., one tile) to the right for each increasing row address. It should be understood that rotation illustratively includes shifting data bits to the right (e.g., toward higher-numbered columns), and that data bits are wrapped to the left side (e.g., column number zero) if they are shifted past the last column. The amount of rotation may be modulo the total width in columns of the partition. For example, in an embodiment each die of the memory media may include 128 tiles (columns), and each partition may include eight dies. In that embodiment, the partition includes a total of 1024 columns.

In block 508, the compute device 100 stores the rotated row at the row address in the memory media 110. In block 510, the compute device 100 stores a duplicate copy of the rotated row at the row address plus a predetermined row offset in the memory media 110. Thus, the compute device 100 may store duplicate copies of the data cluster separated by a predetermined amount of rows in the memory media 110. In some embodiments, in block 512, the predetermined row offset may be based on the width of the partition in columns. For example, in some embodiments the predetermined row offset may be equal to 128, to 1024, or to another number of tiles included in the partition of the memory media 110. After writing the data, the method 500 loops back to block 502 to perform additional memory access operations.

Referring back to block 502, if the compute device 100 performs a read operation, the method 500 branches to block 514, in which the compute device 100 determines whether to perform a column read operation or a row read operation. If the compute device 100 determines to perform a column read, the method 500 branches to block 522, described below. If the compute device 100 determines to perform a row read, the method 500 advances to block 516.

In block 516, the compute device 100 (e.g., the media access circuitry 108) receives a logical row read request. The logical row read request may include a row address identifying logical row data stored in the memory 104. The logical row data may be a row of data included in a cluster. For example, the media access circuitry 108 may receive from the memory controller 106 a memory access request that originated from the host processor 102. In some embodiments, the memory access may be generated by the vector function unit 130 of the memory controller 106, for example in response to a macro command received from the host processor 102.

In block 518, the compute device 100 reads rotated row data at the row address in the memory media 110. The rotated row data is stored in the memory media 110 in a rotated format as described above in connection with block 506. In block 520, the compute device 100 un-rotates the rotated data across a partition of the memory media 110. The compute device 100 may perform a rotation that is the inverse of the rotation that was performed when the row data was stored in the memory media 110. Thus, by un-rotating the data, the compute device 100 recovers the original, logical row data. The amount of rotation may be determined by the row address. Illustratively, to recover the row data, the compute device 100 rotates the logical row data by one column (i.e., one tile) to the left for each increasing row address. It should be understood that rotation illustratively includes shifting data bits to the left (e.g., toward lower-numbered columns), and that data bits are wrapped to the right side (e.g., the largest column number) if they are shifted past the column zero. The amount of rotation may be modulo the total width in columns of the partition. For example, in an embodiment each die of the memory media may include 128 tiles (columns), and each partition may include eight dies. In that embodiment, the partition includes a total of 1024 columns. After reading the data, the method 500 loops back to block 502 to perform additional memory access operations.

Referring back to block 514, if the compute device 100 determines to perform a column read operation, the method 500 branches to block 522, in which the compute device (e.g., the media access circuitry 108) receives a logical column read request. The column read request identifies a block address and a logical column number. The block address may be a row address that includes the starting row and/or column of the cluster (e.g., row zero). In block 524, the compute device 100 determines a base address based on the block address and the column number. The base address identifies a row in the memory media 110 that includes the requested logical column number in physical column zero in the memory media 110. The base address may be determined using a combination of arithmetic operations (e.g., addition, subtraction, and/or modulus). For example, the base address may be the block address plus the width in columns of the memory partition minus the logical column number, modulus the column width.

In block 526, the compute device 100 reads logical column data diagonally from the memory media 110 starting at the base address. Reading the column data diagonally includes reading a data element (e.g., bit) from column zero at the base address, incrementing internal counters for the row number and column number, and continuing to read columns across the memory media 110. In some embodiments, the compute device 100 may read the column data in parallel across multiple dies of the partition. In those embodiments, a single command/address bus may be used to communicate a row address to each die, and each die may add a preconfigured offset to the row address. Reading starting at the base address reads logical column data from rotated rows stored as described above in connection with block 508. In some embodiments, in block 528 the compute device 100 may read at least part of the logical column from the duplicate copy of the rotated rows stored as described above in connection with block 510. In some embodiments, in block 530 the compute device 100 discards one or more data elements (e.g., bits) read from rows that were not included in the data cluster. For example, data read from rows positioned between the cluster and the duplicate copy of the cluster may be discarded. After reading the logical column, the method 500 loops back to block 502 to perform additional memory access operations.

Figure 6:
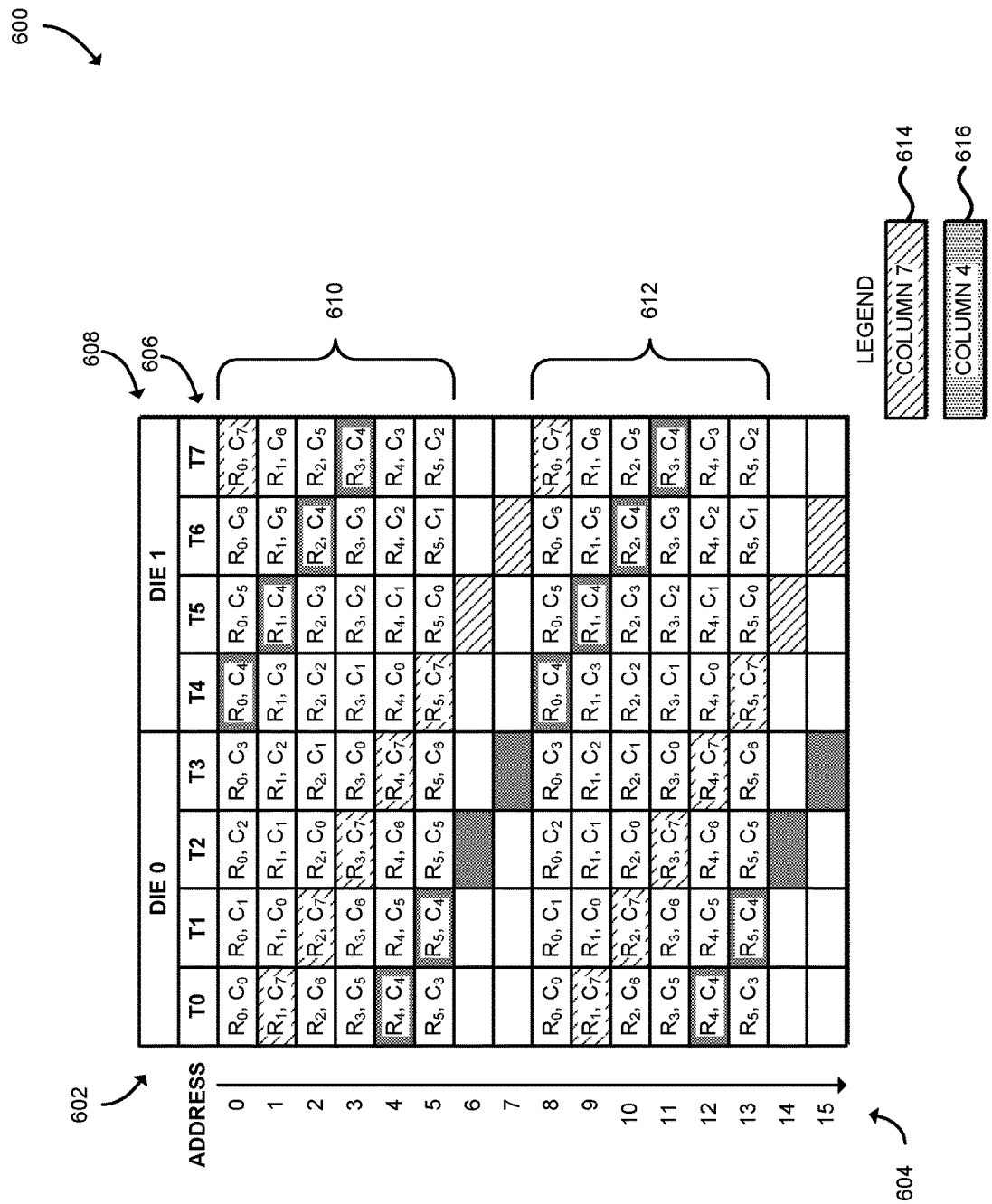
FIG. 6 is a schematic diagram illustrating a memory layout of clustered data that may be accessed with the method of FIG. 5.

Referring now to FIG. 6, diagram 600 illustrates one potential embodiment of a column data format that may be accessed as described above in connection with the method of FIG. 5. The diagram 600 illustrates a memory media 602, for example the memory media 110 and/or the memory media 120 of FIG. 1. As shown, the illustrative memory media 602 is arranged into a number of rows 604 and tiles 606 (i.e., columns 606). Each of the tiles 606 is included in a die 608. Illustratively, each row 604 includes two dies 608 having four tiles 606 each, for a total of eight tiles 606; however, in other embodiments, each row may include 128 tiles, 1024 tiles, or another number of tiles. Each row 604 is addressable by a row address, and each tile 606 is addressable by a column number.

The illustrative memory media 602 has stored therein a data cluster 610 and a duplicate data cluster 612. Each of the clusters 610, 612 is a logical matrix having six rows. As shown, the columns 606 of each row 604 are rotated by one column position for each subsequent row across the memory media 602. For example, logical row zero, logical column zero is stored in row address zero, tile number zero; logical row one, logical column zero is stored in row address one, tile number one; and so on. The duplicate data cluster 612 is stored at a predetermined row offset from the data cluster 610. Illustratively, the predetermined row offset is two, so that the starting address of the duplicate data cluster 612 is eight, which is equal to the width of the memory media 602 in tiles 606. Thus, in the illustrative embodiment, each data cluster may include no more rows than the number of columns in the memory media 602. Of course, in other embodiments, a different predetermined row offset may be used (e.g., 128 rows or 1024 rows).

Each logical column of the data cluster 610 may be read using a single column read operation. The column read may read physical bits from both the data cluster 610 and the duplicate data cluster 612. The diagram 600 illustrates data included in logical column seven as highlighted cells 614. An illustrative column read of logical column seven may start at row address one, tile number zero and continue diagonally to row address two, tile number one, row address three, tile number two, and so on, up to row address eight, tile address seven. Data read from row address six, tile number five and row address seven, tile number six may be discarded, as it is not included in the cluster 610. Similarly, the diagram 600 also illustrates data included in logical column four as highlighted cells 616. An illustrative column read of logical column four may start at row address four, tile number zero and continue diagonally to row address five, tile number one, row address six, tile number two, and so on, up to row address 11, tile address seven. Data read from row address six, tile number two and row address seven, tile number three may be discarded, as it is not included in the cluster 610. The other logical columns of the data cluster 610 may be similarly read using a single column read operation at the expense of storing the duplicate data cluster 612.

Figure 7:
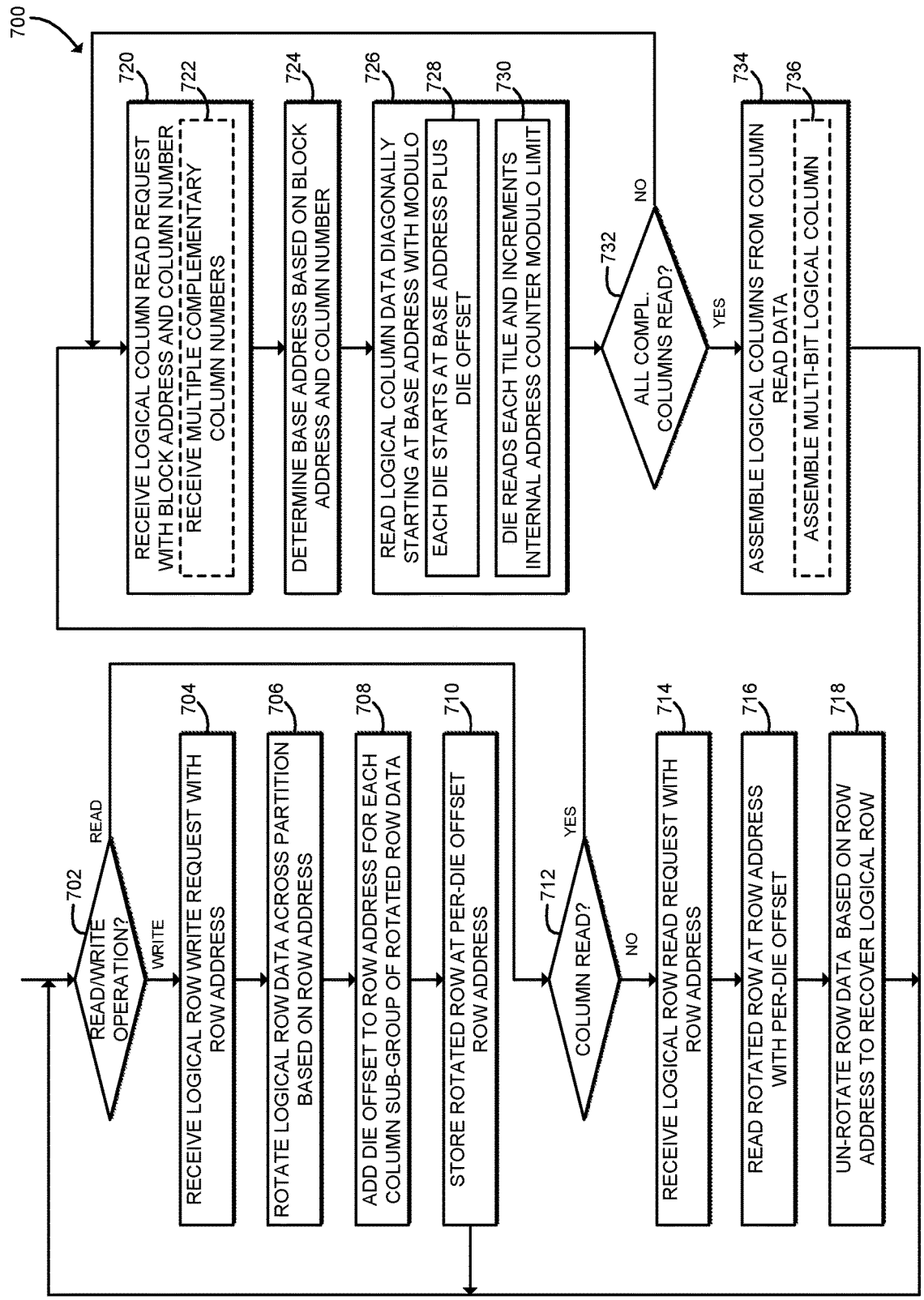
FIG. 7 is a simplified flow diagram of at least one embodiment of a method for clustered data access that may be performed by the compute device of FIG. 1.

Referring now to FIG. 7, the compute device 100, in operation, may execute a method 700 for clustered data access. The method 700 is described with reference to the memory 104. However, it should be understood that the method 700 could be performed additionally or alternatively using the data storage device 114. The method 700 begins with block 702 in which the compute device 100 (e.g., the media access circuitry 108) determines whether to perform a read operation or a write operation. If the compute device 100 determines to perform a read operation, the method 700 branches ahead to block 720, described below. If the compute device 100 determines to perform a write operation, the method 700 advances to block 704.

In block 704, the compute device 100 (e.g., the media access circuitry 108) receives a logical row write request. The logical row write request may include a row address and logical row data for storage in the memory 104. The logical row data may be a row of data included in a cluster. For example, the media access circuitry 108 may receive from the memory controller 106 a memory access request that originated from the host processor 102. In some embodiments, the memory access may be generated by the vector function unit 130 of the memory controller 106, for example in response to a macro command received from the host processor 102.

In block 706, the compute device 100 rotates the logical row data across a partition of the memory media 110. The amount of rotation may be determined by the row address. Illustratively, the compute device 100 rotates the logical row data by one column (i.e., one tile) to the right for each increasing row address. The amount of rotation may be modulo the total width in columns of the partition. For example, in an embodiment each die of the memory media may include 128 tiles (columns), and each partition may include eight dies. In that embodiment, the partition includes a total of 1024 columns.

In block 708, the compute device 100 adds a die offset to the row address for each column sub-group of the rotated row data. Each column sub-group may include a number of columns equal to the number of tiles included in a die of the memory media 110. For example, in an illustrative embodiment, the rotated row data may include eight column sub-groups of 128 columns each. Each die offset is an integer number of rows added to the row address of the write request. The die offset for each die may be configured such that column data may be stored diagonally across dies of the memory media 110. For example, in the illustrative embodiment having dies of width 128 tiles, the die offset for die number zero may be zero, the die offset for die number one may be 128, and so on. The die offset for each die may be hard-coded, configured at boot time, or otherwise programmed. In block 710, the compute device 100 stores the rotated row at the row address in the memory media 110 subject to the per-die offset. In some embodiments, each die may apply the associated die offset independently. For example, each die may add the associated die offset to a row address received via a command command/address bus. After writing the data, the method 700 loops back to block 702 to perform additional memory access operations.

Referring back to block 702, if the compute device 100 performs a read operation, the method 700 branches to block 712, in which the compute device 100 determines whether to perform a column read operation or a row read operation. If the compute device 100 determines to perform a column read, the method 700 branches to block 720, described below. If the compute device 100 determines to perform a row read, the method 700 advances to block 714.

In block 714, the compute device 100 (e.g., the media access circuitry 108) receives a logical row read request. The logical row read request may include a row address identifying logical row data stored in the memory 104. The logical row data may be a row of data included in a cluster. For example, the media access circuitry 108 may receive from the memory controller 106 a memory access request that originated from the host processor 102. In some embodiments, the memory access may be generated by the vector function unit 130 of the memory controller 106, for example in response to a macro command received from the host processor 102.

In block 716, the compute device 100 reads rotated row data at the row address in the memory media 110 subject to the per-die offset. For example, each die may add the associated die offset to a row address received via a command command/address bus. The rotated row data is stored in the memory media 110 in a rotated format as described above in connection with block 706. In block 718, the compute device 100 un-rotates the rotated data across a partition of the memory media 110. The compute device 100 may perform a rotation that is the inverse of the rotation that was performed when the row data was stored in the memory media 110. Thus, by un-rotating the data, the compute device 100 recovers the original, logical row data. The amount of rotation may be determined by the row address. Illustratively, to recover the row data, the compute device 100 rotates the logical row data by one column (i.e., one tile) to the left for each increasing row address. It should be understood that rotation illustratively includes shifting data bits to the left (e.g., toward lower-numbered columns), and that data bits are wrapped to the right side (e.g., the largest column number) if they are shifted past the column zero. The amount of rotation may be modulo the total width in columns of the partition. For example, in an embodiment each die of the memory media may include 128 tiles (columns), and each partition may include eight dies. In that embodiment, the partition includes a total of 1024 columns. After reading the data, the method 700 loops back to block 702 to perform additional memory access operations.

Referring back to block 712, if the compute device 100 determines to perform a column read operation, the method 700 branches to block 720, in which the compute device (e.g., the media access circuitry 108) receives a logical column read request. The column read request identifies a block address and a logical column number. The block address may be a row address that includes the starting row and/or column of the cluster (e.g., row zero). In some embodiments, in block 722 the compute device 100 may receive multiple complementary column numbers for multiple complementary logical columns. As described further below, data from multiple complementary columns is read during a column read operation issued for the starting address of one of the complementary columns. All data of the complementary columns may be assembled after issuing reads for the starting address of each of the complementary columns.

In block 724, the compute device 100 determines a base address based on the block address and the column number. The base address identifies a row in the memory media 110 that includes the requested logical column number in physical column zero in the memory media 110. The base address may be determined using a combination of arithmetic operations (e.g., addition, subtraction, and/or modulus). For example, the base address may be the block address plus the width in columns of the memory partition minus the logical column number, modulus the column width.

In block 726, the compute device 100 reads logical column data diagonally from the memory media 110 starting at the base address and using a modulo limit counter. In block 728, each die of the memory media 100 starts reading data at the base address plus a corresponding die offset. A single command/address bus may be used to communicate a row address to each die, and each die may add the preconfigured die offset to the row address. The compute device 100 may read the column data in parallel across multiple dies of the partition. In block 730, each die reads column data (e.g., a bit) from the current tile at the current row address, increments internal counters for row address and column number modulo a preconfigured modulo limit, and continues reading tiles across the die. The modulo limit may be, for example, 128, 256, or another number.

In block 732, the compute device 100 determines whether all complementary columns have been read. For example, the compute device 100 may determine whether column read operations have been issued for the starting address of each column in a group of complementary columns. If not, the method 700 loops back to block 720 to continue performing column reads of the complementary columns. If each complementary column has been read, the method 700 advances to block 734.

In block 734, the compute device 100 assembles logical columns from the data read with the column read operations. In some embodiments, in block 736, the compute device 100 may assemble a single logical column that includes multi-bit column entries. For example, each data point of the logical column may be a 4-bit or 8-bit value such as genomic variant data. Each bit of the multi-bit column entry corresponds to a complementary column as described above. Accordingly, the compute device 100 may read a group of complementary columns without discarding any data from multiple complementary reads. Thus, the compute device 100 may provide column reads with maximum throughput and without reread penalty even in the presence of modulo limits. The compute device 100 may particularly improve performance for use cases with data that is multiple bits long. After reading and assembling the logical column, the method 700 loops back to block 702 to perform additional memory access operations.

Figure 8:
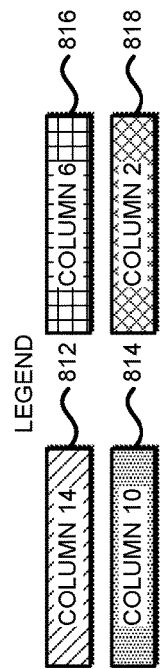
Figure 9:
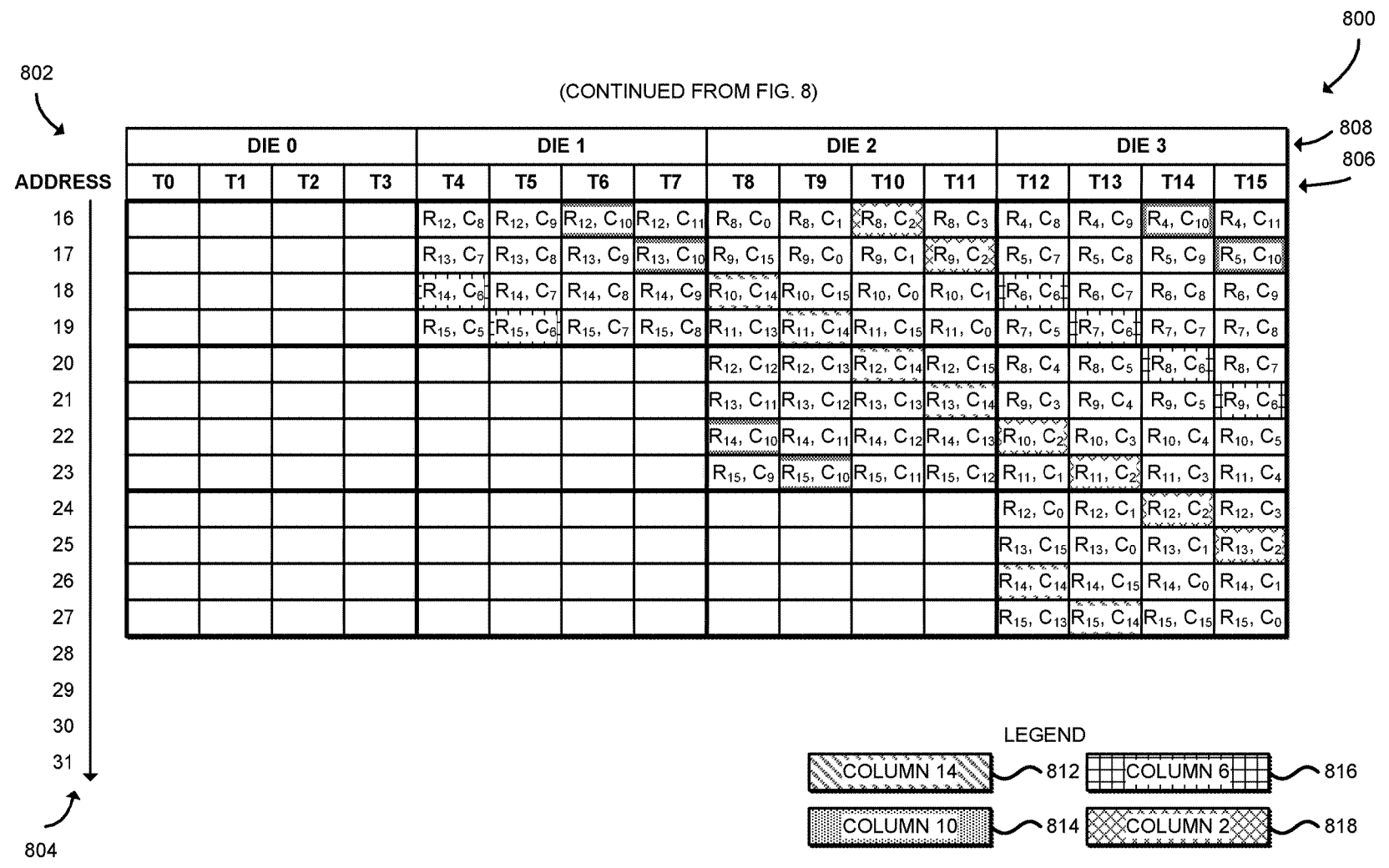

Referring now to FIGS. 8-9, diagram 800 illustrates one potential embodiment of a column data format that may be accessed as described above in connection with the method of FIG. 7. The diagram 800 illustrates a memory media 802, for example the memory media 110 and/or the memory media 120 of FIG. 1. As shown, the illustrative memory media 802 is arranged into a number of rows 804 and tiles 806 (i.e., columns 806). Each of the tiles 806 is included in a die 808. Illustratively, each row 804 is formed from four dies 808 including four tiles 806 for a total of 16 tiles 806. However, in other embodiments, each row may include another number of dies 808 and/or tiles 806, such as eight dies of 128 tiles each, for a total of 1024 tiles. Each row 804 is addressable by a row address, and each tile 806 is addressable by a column number. Each die includes a preconfigured modulo limit 810, which is illustratively four. In some embodiments, the modulo limit may be a different number, such as 128 or 256.

The illustrative memory media 802 has stored therein a data cluster that is a logical matrix having 16 logical rows and 16 logical columns. As shown, the columns 806 of each row 804 are rotated by one column position for each subsequent row across the memory media 802. For example, logical row zero, logical column zero is stored in row address zero, tile number zero; logical row one, logical column zero is stored in row address one, tile number one; and so on. Additionally, the logical rows are offset within each die 808 by an associated die offset. Illustratively, die zero is offset by zero, die one is offset by four, die two is offset by eight, and die three is offset by 12. Accordingly, logical row zero, logical column four is stored at row address four, tile four of die one; logical row zero, logical column eight is stored at row eight, tile eight of die two, and so on.

Each group of complementary columns of the data cluster may be read with a single group of column read operations. Each column read operation may read bits from multiple complementary columns. The diagram 800 illustrates a group of complementary columns including logical column 14 as highlighted cells 812, logical column 10 as highlighted cells 814, logical column six as highlighted cells 816, and logical column two as highlighted cells 818. An illustrative column read of column 14 starts at row address two, tile zero in die zero, which reads logical row two, logical column 14. Due to the per-die offsets, reads may be simultaneously performed at row address six, tile four in die one (which reads logical row two, logical column two), row address 10, tile eight in die two (which reads logical row two, logical column six), and row address 14, tile 12 in die three (which reads logical row two, logical column 10). After reading the current bit, each of the dies increments one or more internal counters subject to the modulo limit, and the column read continues at row address three, tile one in die zero (which reads logical row three, logical column 14), row address seven, tile five in die one (which reads logical row three, logical column two), row address 11, tile nine in die two (which reads logical row three, logical column six), and row address 15, tile 13 in die three (which reads logical row three, logical column 10). The dies increment internal counters, and due to the modulo limit 810 the row counter wraps around. Thus, the column read continues at row address zero, tile two in die zero (which reads logical row zero, logical column two), row address four, tile six in die one (which reads logical row zero, logical column six), row address eight, tile 10 in die two (which reads logical row zero, logical column 10), and row address 12, tile 14 in die three (which reads logical row zero, logical column 14). The dies increment internal counters, and the column read continues at row address one, tile three in die zero (which reads logical row one, logical column two), row address five, tile seven in die one (which reads logical row one, logical column six), row address 9, tile 11 in die two (which reads logical row one, logical column 10), and row address 13, tile 15 in die three (which reads logical row one, logical column 14).

After reading across all tiles 806 of the memory media 802, the column read is complete, and the compute device 100 has read data from each of the complementary columns 812, 814, 816, 818 (i.e., logical columns two, six, 10, and 14). The compute device 100 performs additional, similar column reads starting at row address six, tile zero in die zero (starting address for logical column 10), at row address 10, tile zero in die zero (starting address for logical column six), and at row address 14, tile zero in die zero (starting address for logical column 2). Thus after performing four column read operations, the compute device 100 has read all data included in the complementary columns 812, 814, 816, 818 and may assemble the logical columns two, six, 10, and 14. As described above, the compute device 100 may access those complementary columns as four separate logical columns or as a single multi-bit logical column.

Figure 10:
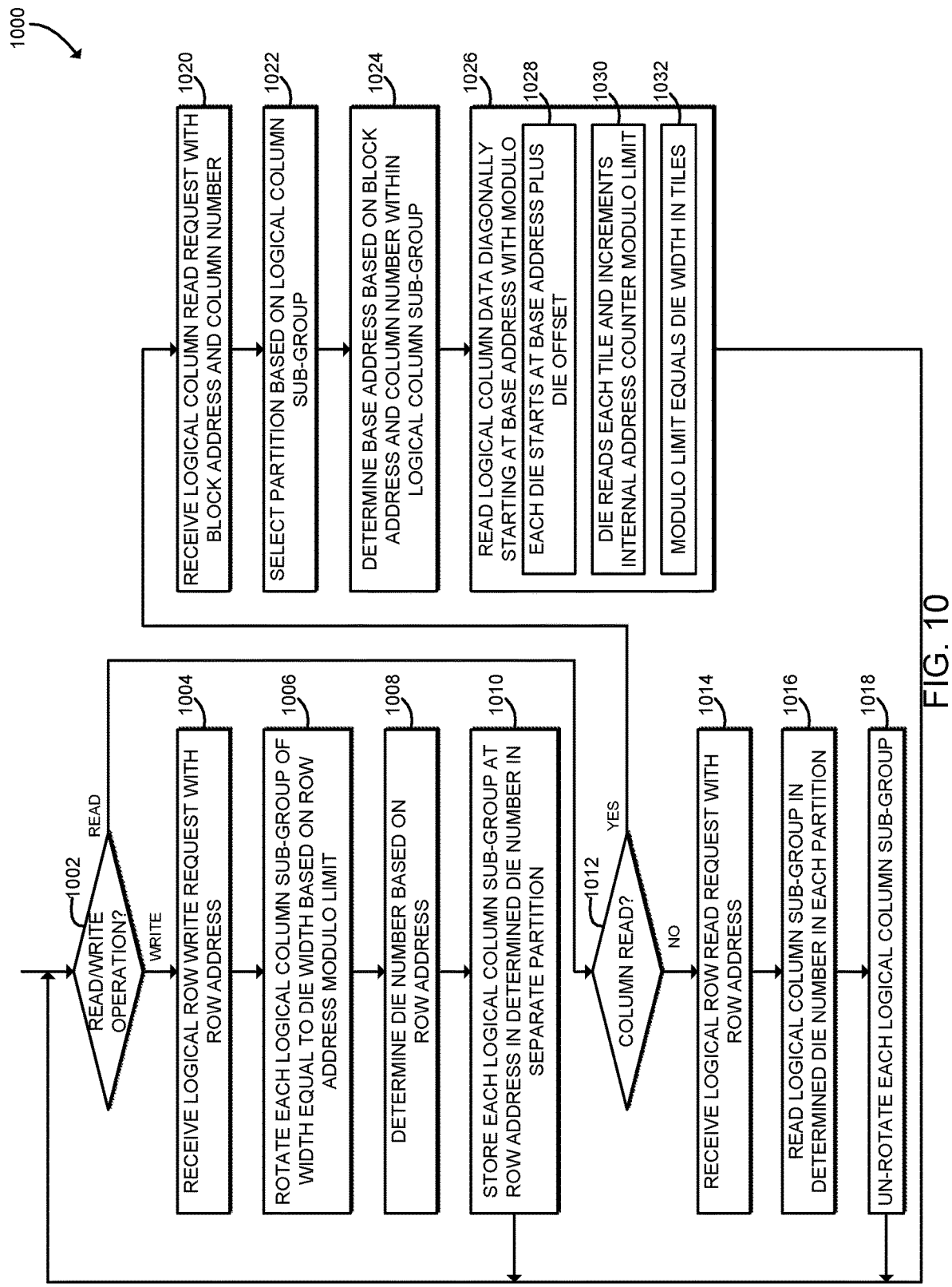
FIG. 10 is a simplified flow diagram of at least one embodiment of a method for clustered data access that may be performed by the compute device of FIG. 1.

Referring now to FIG. 10, the compute device 100, in operation, may execute a method 1000 for clustered data access. The method 1000 is described with reference to the memory 104. However, it should be understood that the method 1000 could be performed additionally or alternatively using the data storage device 114. The method 1000 begins with block 1002 in which the compute device 100 (e.g., the media access circuitry 108) determines whether to perform a read operation or a write operation. If the compute device 100 determines to perform a read operation, the method 1000 branches ahead to block 1020, described below. If the compute device 100 determines to perform a write operation, the method 1000 advances to block 1004.

In block 1004, the compute device 100 (e.g., the media access circuitry 108) receives a logical row write request. The logical row write request may include a row address and logical row data for storage in the memory 104. The logical row data may be a row of data included in a cluster. For example, the media access circuitry 108 may receive from the memory controller 106 a memory access request that originated from the host processor 102. In some embodiments, the memory access may be generated by the vector function unit 130 of the memory controller 106, for example in response to a macro command received from the host processor 102.

In block 1006, the compute device 100 rotates each column sub-group within the logical row data. Each column sub-group may include a number of columns equal to the number of tiles included in a die of the memory media 110. For example, in an embodiment each die of the memory media may include 128 tiles (columns), and each partition may include eight dies. In that embodiment, the rotated row data may include eight column sub-groups of 128 columns each. The amount of rotation may be determined by the row address. Illustratively, the compute device 100 rotates the logical row data by one column (i.e., one tile) to the right for each increasing row address, modulo the width in columns of each die. For example, in the illustrative embodiment, for each subsequent row, data in column zero is rotated to the right by one column, data in column 127 wraps to column zero, data in column 128 is rotated to the right by one column, data in column 255 wraps to column 128, and so on.

In block 1008, the compute device 100 determines a die number based on the row address. The die number increases after a number of rows equal to the width of each die in columns. For example, in the illustrative embodiment having 128 columns in each die, rows 0-127 are included in die zero, rows 128-255 are included in die one, and so on.

In block 1010, the compute device 100 stores rotated row data for each logical column sub-group at the row address in the die number determined as described above in a separate partition of the memory media 110. For example, the illustrative embodiment may include eight partitions of eight dies each, with each die having 128 tiles (columns). In that embodiment, data from columns 0-127 may be stored in partition zero, data from columns 128-255 may be stored in partition one, and so on. Continuing that example, within partition zero, rotated data for rows 0-127 of columns 0-127 is stored in die zero, rotated data for rows 128-255 of columns 0-127 is stored in die one, and so on. Similarly, within partition one, rotated data for rows 0-127 of columns 128-255 is stored in die zero, rotated data for rows 128-255 of columns 128-255 is stored in die one, and so on. Accordingly, storing data for an entire logical row may require activating and writing to all partitions of the memory media 110. After writing the data, the method 1000 loops back to block 1002 to perform additional memory access operations.

Referring back to block 1002, if the compute device 100 performs a read operation, the method 1000 branches to block 1012, in which the compute device 100 determines whether to perform a column read operation or a row read operation. If the compute device 100 determines to perform a column read, the method 1000 branches to block 1020, described below. If the compute device 100 determines to perform a row read, the method 1000 advances to block 1014.

In block 1014, the compute device 100 (e.g., the media access circuitry 108) receives a logical row read request. The logical row read request may include a row address identifying logical row data stored in the memory 104. The logical row data may be a row of data included in a cluster. For example, the media access circuitry 108 may receive from the memory controller 106 a memory access request that originated from the host processor 102. In some embodiments, the memory access may be generated by the vector function unit 130 of the memory controller 106, for example in response to a macro command received from the host processor 102.

In block 1016, the compute device 100 reads rotated row data for each logical column sub-group at the row address in a die number determined as described above in connection with block 1008 in a separate partition of the memory media 110. For example, as described above, the illustrative embodiment may include eight partitions of eight dies each, with each die having 128 tiles (columns). In that embodiment, data from columns 0-127 may be read from partition zero, data from columns 128-255 may be read from partition one, and so on. Continuing that example, within partition zero, rotated data for rows 0-127 of columns 0-127 is read from die zero, rotated data for rows 128-255 of columns 0-127 is read from die one, and so on. Similarly, within partition one, rotated data for rows 0-127 of columns 128-255 is read from die zero, rotated data for rows 128-255 of columns 128-255 is read from die one, and so on. Accordingly, reading data for an entire logical row may require activating and reading from all partitions of the memory media 110.

In block 1018, the compute device 100 un-rotates the rotated data of each logical column sub-group. The compute device 100 may perform a rotation that is the inverse of the rotation that was performed when the row data was stored in the memory media 110. Thus, by un-rotating the data, the compute device 100 recovers the original, logical row data. Illustratively, the compute device 100 rotates the logical row data by one column (i.e., one tile) to the left for each increasing row address, modulo the width in columns of each die. For example, in the illustrative embodiment, for each subsequent row, data in column zero wraps to column 127, data in column 127 is rotated to the left by one column, data in column 128 wraps to column 255, data in column 255 is rotated to the left by one column, and so on. After reading the data, the method 1000 loops back to block 1002 to perform additional memory access operations.

Referring back to block 1012, if the compute device 100 determines to perform a column read operation, the method 1000 branches to block 1020, in which the compute device (e.g., the media access circuitry 108) receives a logical column read request. The column read request identifies a block address and a logical column number. The block address may be a row address that includes the starting row and/or column of the cluster (e.g., row zero).

In block 1022, the compute device 100 selects a partition based on the logical column sub-group associated with the requested column number. As described above, each column sub-group may include a number of columns equal to the number of tiles included in a die of the memory media 110. For example, in the illustrative embodiment each die of the memory media includes 128 tiles (columns). For columns 0-127, partition zero may be selected, for columns 128-255, partition one may be selected, and so on.

In block 1024, the compute device 100 determines a base address based on the block address and a column number within the logical column sub-group. The base address identifies a row in the memory media 110 that includes the requested logical column number in physical column zero in the memory media 110. The base address may be determined using a combination of arithmetic operations (e.g., addition, subtraction, and/or modulus). Illustratively, the base address is the block address plus the width in columns of a die minus the column number within the logical column sub-group. For example, in the illustrative embodiment, given a block address of zero, the column zero may have a base address of zero, column one may have a base address of 127, column 128 may have a base address of zero, column 129 may have a base address of 127, and so on.

In block 1026, the compute device 100 reads logical column data diagonally from the memory media 110 starting at the base address and using a modulo limit counter, within the partition selected as described above. In block 1028, each die of the memory media 100 starts reading data at the base address plus a corresponding die offset. A single command/address bus may be used to communicate a row address to each die, and each die may add the preconfigured die offset to the row address. The compute device 100 may read the column data in parallel across multiple dies of the selected partition. In block 1030, each die reads column data (e.g., a bit) from the current tile at the current row address, increments internal counters for row address and column number modulo a preconfigured modulo limit, and continues reading tiles across the die. In block 1032, the modulo limit equals the width of each die in tiles. Thus, in the illustrative embodiment, the modulo limit is 128. Accordingly, the compute device 100 may read any column of the data cluster in a single pass, without re-reads due to the modulo counter. Accordingly, the compute device 100 may provide maximum column read speeds for all columns in a cluster having encoded length less than the partition width (e.g., 1024 bits in the illustrative embodiment). Because each individual row is stored in multiple partitions, row read speed for an individual row may be decreased. Alternatively, row read throughput may be maintained at the expense of latency for multiple row reads performed together (e.g., by performing reads of multiple partitions to recover multiple rows). After reading the logical column, the method 1000 loops back to block 1002 to perform additional memory access operations.

Figure 11:
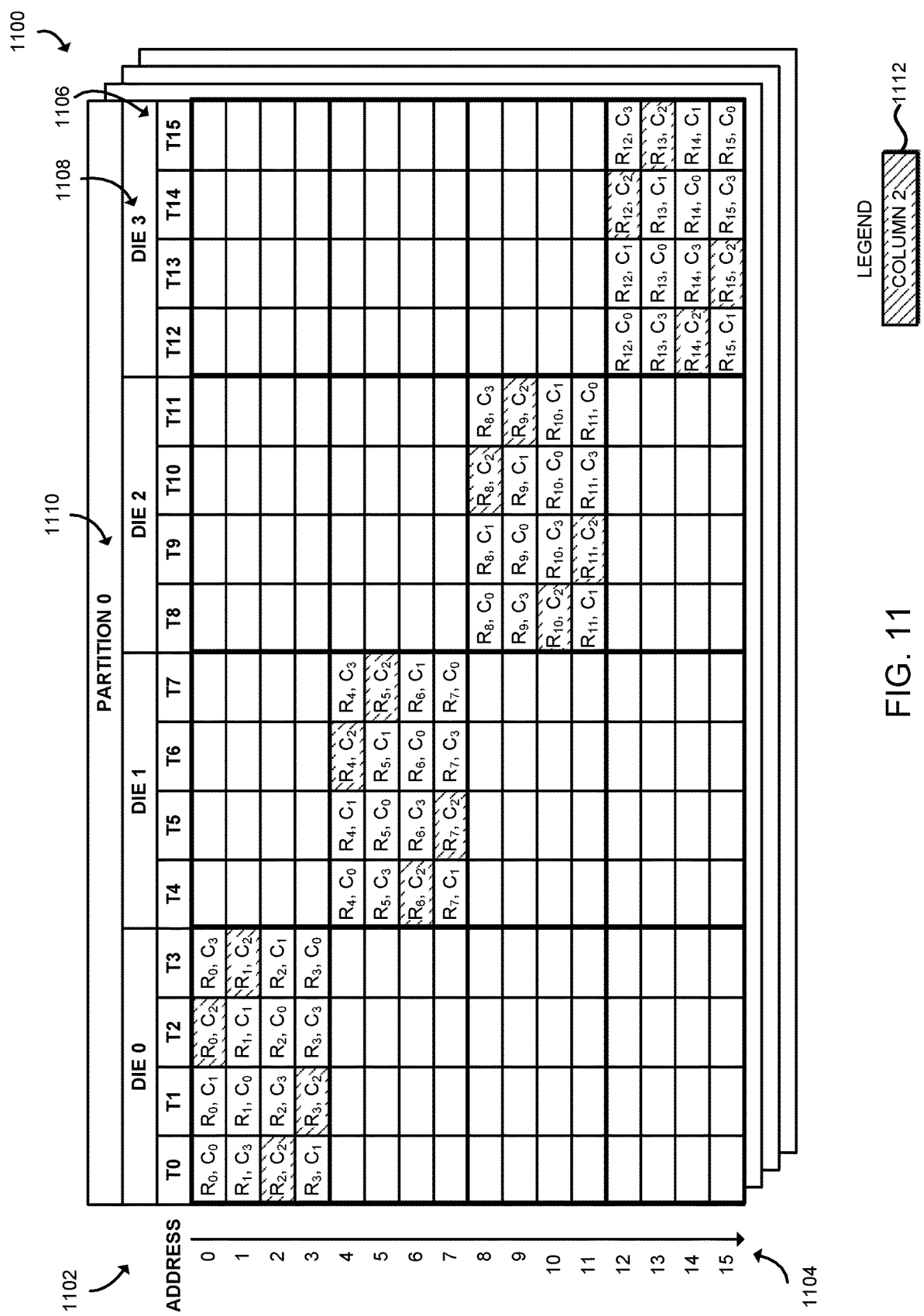
FIG. 11 is a schematic diagram illustrating a memory layout of clustered data that may be accessed with the method of FIG. 10.

Referring now to FIG. 11, diagram 1100 illustrates one potential embodiment of a column data format that may be accessed as described above in connection with the method of FIG. 10. The diagram 1100 illustrates a memory media 1102, for example the memory media 110 and/or the memory media 120 of FIG. 1. As shown, the illustrative memory media 1102 is arranged into a number of rows 1104 and tiles 1106 (i.e., columns 1106). Each of the tiles 1106 is included in a die 1108. Illustratively, each row 1104 is formed from four dies 1108 including four tiles 1106 for a total of 16 tiles 1106. However, in other embodiments, each row may include another number of dies 1108 and/or tiles 1106, such as eight dies of 128 tiles each, for a total of 1024 tiles. As shown, the memory media 1102 is three-dimensional, and thus the four dies 1108 are included in a partition 1110. The memory media 1102 includes four partitions 1110, and each partition 1110 includes four dies 1108. In other embodiments, the memory media 1102 may include a different number of partitions 1110, such as eight partitions. Each row 1104 is addressable by a row address, and each tile 1106 is addressable by a column number. Each die includes a preconfigured modulo limit, which is illustratively four. As described above, the modulo limit is equal to the width of each die 1108 in tiles 1106.

The illustrative memory media 1102 has stored therein a data cluster that is a logical matrix having 16 logical rows and 16 logical columns. As shown, the columns 1106 of each row 1104 are rotated by one column position for each subsequent row in a column sub-group across each die 1108. For example, logical row zero, logical column three is stored in row address zero, tile number three; and logical row one, logical column three is rotated and stored in row address one, tile number zero; and so on. Additionally, each group of four rows (equal to the modulo limit) is stored in a different die 1108. As shown, rows 0-3 are stored in die zero, rows 4-7 are stored in die one, rows 8-11 are stored in die three, and rows 12-15 are stored in die four. Further, each partition 1110 stores data for four of the logical columns (equal to the width of each die). As shown, logical columns 0-3 are stored in partition zero. Additionally, logical columns 4-7 are stored in partition one, logical columns 8-11 are stored in partition two, and logical columns 12-15 are stored in partition three.

Each column of the data cluster may be read with a single column read operation. As an illustrative example, the diagram 1100 shows data included in logical column two as highlighted cells 1112. An illustrative column read of logical column two may start in partition zero at row address two, tile zero in die zero. Using a shared command/address bus and per-die offsets, reads may be simultaneously performed at row address six, tile four in die one, row address 10, tile eight in die two, and row address 14, tile 12 in die three. After reading the current bit, each of the dies increments one or more internal counters subject to the modulo limit, and the column read continues at row address three, tile one in die zero; row address seven, tile five in die one; row address 11, tile nine in die two; and row address 15, tile 13 in die three. The dies increment internal counters, and due to the modulo limit of four, the row counter wraps around. Thus, the column read continues at row address zero, tile two in die zero; row address four, tile six in die one; row address eight, tile 10 in die two; and row address 12, tile 14 in die three. The dies increment internal counters, and the column read continues at row address one, tile three in die zero; row address five, tile seven in die one; row address 9, tile 11 in die two; and row address 13, tile 15 in die three.

After reading data across all of the tiles in the partition 1110, the column read is completed, and the compute device has read all data from the logical column 1112. By starting the column read at a different row address, the compute device 100 may read any of logical columns 0-3 from partition zero in a single column read operation. Similarly, the compute device 100 may any of read logical columns 4-7 from partition one, logical columns 8-11 from partition two, and logical columns 12-15 from partition three in a single column read operation. Accordingly, the compute device 100 may read any logical column from the data cluster in a single column read operation without re-reads due to cluster edges or modulo limits. Thus, the compute device 100 may maximize throughput for column reads.

Figure 12:
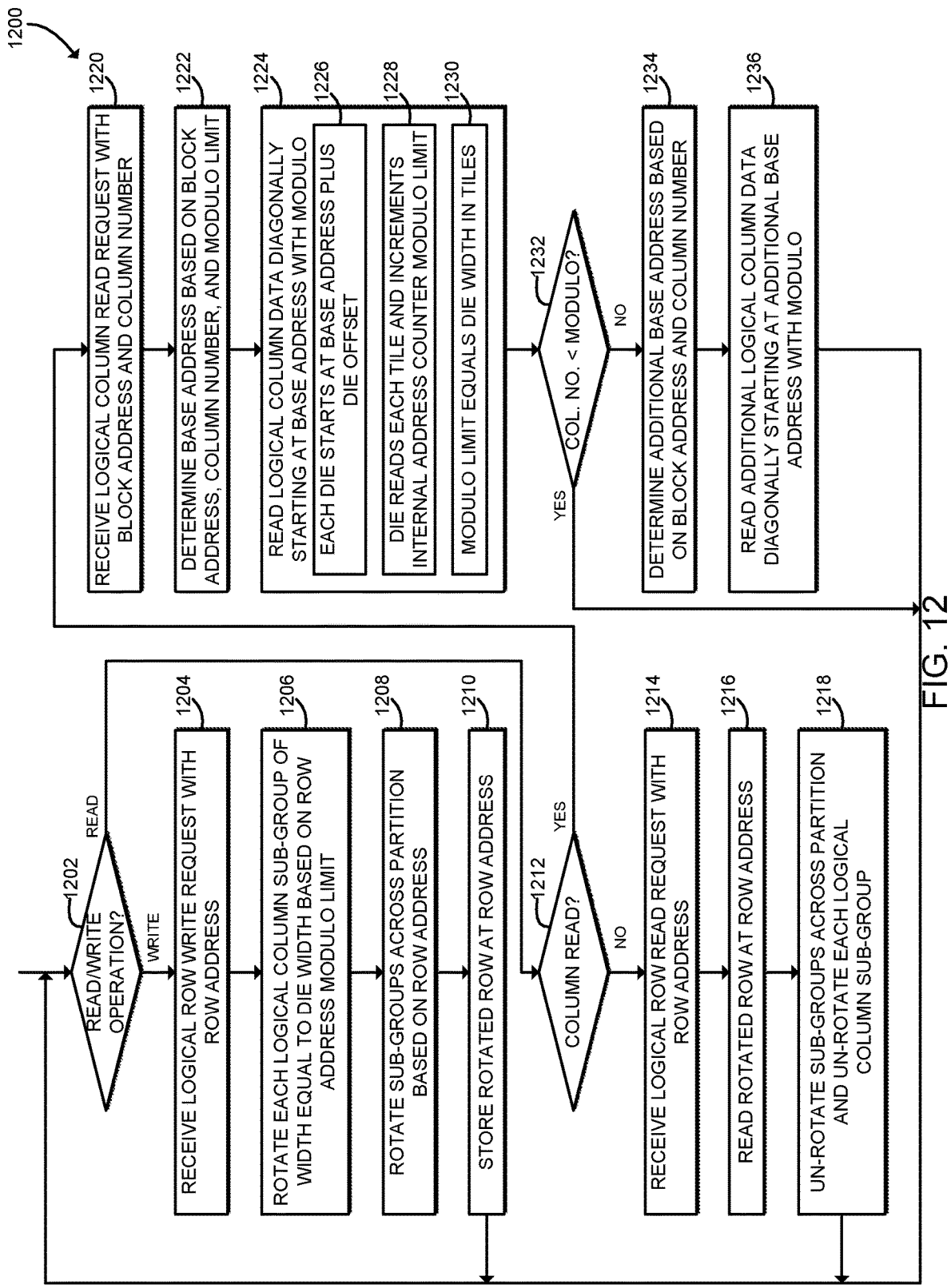
FIG. 12 is a simplified flow diagram of at least one embodiment of a method for clustered data access that may be performed by the compute device of FIG. 1.

Referring now to FIG. 12, the compute device 100, in operation, may execute a method 1200 for clustered data access. The method 1200 is described with reference to the memory 104. However, it should be understood that the method 1200 could be performed additionally or alternatively using the data storage device 114. The method 1200 begins with block 1202 in which the compute device 100 (e.g., the media access circuitry 108) determines whether to perform a read operation or a write operation. If the compute device 100 determines to perform a read operation, the method 1200 branches ahead to block 1220, described below. If the compute device 100 determines to perform a write operation, the method 1200 advances to block 1204.

In block 1204, the compute device 100 (e.g., the media access circuitry 108) receives a logical row write request. The logical row write request may include a row address and logical row data for storage in the memory 104. The logical row data may be a row of data included in a cluster. For example, the media access circuitry 108 may receive from the memory controller 106 a memory access request that originated from the host processor 102. In some embodiments, the memory access may be generated by the vector function unit 130 of the memory controller 106, for example in response to a macro command received from the host processor 102.

In block 1206, the compute device 100 rotates each column sub-group within the logical row data. Each column sub-group may include a number of columns equal to the number of tiles included in a die of the memory media 110. For example, in an embodiment each die of the memory media may include 128 tiles (columns), and each partition may include eight dies. In that embodiment, the rotated row data may include eight column sub-groups of 128 columns each. The amount of rotation may be determined by the row address. Illustratively, the compute device 100 rotates the logical row data by one column (i.e., one tile) to the right for each increasing row address, modulo the width in columns of each die. For example, in the illustrative embodiment, for each subsequent row, data in column zero is rotated to the right by one column, data in column 127 wraps to column zero, data in column 128 is rotated to the right by one column, data in column 255 wraps to column 128, and so on.

In block 1208, the compute device 100 rotates the column sub-groups across the partition based on the row address. The compute device 100 may rotate sub-blocks of data based on the width of each die in columns. For example, in the illustrative embodiment, the column sub-groups of rows 0-127 of a block are not rotated. Continuing that example, the column sub-groups of rows 128-255 are rotated to the right by one die (e.g., 128 columns). Thus, the logical column subgroup 0-127 is stored in tiles 128-255, the logical column subgroup 128-255 is stored in tiles 256-383, and so on.

In block 1210, the compute device 100 stores the rotated row data at the row address. Each row is stored in a single partition of the memory media 110, and thus an entire rotated row may be stored in a single row write operation. After writing the data, the method 1200 loops back to block 1202 to perform additional memory access operations.

Referring back to block 1202, if the compute device 100 performs a read operation, the method 1200 branches to block 1212, in which the compute device 100 determines whether to perform a column read operation or a row read operation. If the compute device 100 determines to perform a column read, the method 1200 branches to block 1220, described below. If the compute device 100 determines to perform a row read, the method 1200 advances to block 1214.

In block 1214, the compute device 100 (e.g., the media access circuitry 108) receives a logical row read request. The logical row read request may include a row address identifying logical row data stored in the memory 104. The logical row data may be a row of data included in a cluster. For example, the media access circuitry 108 may receive from the memory controller 106 a memory access request that originated from the host processor 102. In some embodiments, the memory access may be generated by the vector function unit 130 of the memory controller 106, for example in response to a macro command received from the host processor 102.

In block 1216, the compute device 100 reads rotated row data at the row address in the memory media 110. The rotated row data is stored in the memory media 110 in a rotated format as described above in connection with blocks 1206, 1208. In block 1218, the compute device 100 un-rotates the sub-groups of rotated data across a partition of the memory media 110 and then un-rotates each logical column sub-group. The compute device 100 may perform rotations that are inverses of the rotations that were performed when the row data was stored in the memory media 110. Thus, by un-rotating the data, the compute device 100 recovers the original, logical row data. As described above, the rotation of sub-blocks of data may be based on the width of each die in columns. For example, in the illustrative embodiment, the column sub-groups of rows 0-127 of a block are not rotated, the column sub-groups of rows 128-255 are rotated to the left by one die (e.g., 128 columns), and so on. Continuing the example, the amount of rotation within each logical column sub-group may be determined by the row address. Illustratively, the compute device 100 rotates the logical row data by one column (i.e., one tile) to the left for each increasing row address, modulo the width in columns of each die. For example, in the illustrative embodiment, for each subsequent row, data in column zero wraps to column 127, data in column 127 is rotated to the left by one column, data in column 128 wraps to column 255, data in column 255 is rotated to the left by one column, and so on. After reading the data, the method 1200 loops back to block 1202 to perform additional memory access operations.

Referring back to block 1212, if the compute device 100 determines to perform a column read operation, the method 1200 branches to block 1220, in which the compute device (e.g., the media access circuitry 108) receives a logical column read request. The column read request identifies a block address and a logical column number. The block address may be a row address that includes the starting row and/or column of the cluster (e.g., row zero).

In block 1222, the compute device 100 determines a base address based on the block address, the column number, and a modulo limit. The base address identifies a row in the memory media 110 that includes the requested logical column number in physical column zero in the memory media 110. The base address may be determined using a combination of arithmetic operations (e.g., addition, subtraction, and/or modulus).

In block 1224, the compute device 100 reads logical column data diagonally from the memory media 110 starting at the base address and using a modulo limit counter. In block 1226, each die of the memory media 100 starts reading data at the base address plus a corresponding die offset. A single command/address bus may be used to communicate a row address to each die, and each die may add the preconfigured die offset to the row address. The compute device 100 may read the column data in parallel across multiple dies of the selected partition. In block 1228, each die reads column data (e.g., a bit) from the current tile at the current row address, increments internal counters for row address and column number modulo a preconfigured modulo limit, and continues reading tiles across the die. In block 1230, the modulo limit equals the width of each die in tiles. Thus, in the illustrative embodiment, the modulo limit is 128.

In block 1232, the compute device 100 determines whether the logical column number is less than the modulo limit (e.g., 128). If, so, the column read is complete and the method 1200 loops back to block 1202 to perform additional memory access operations. Accordingly, the compute device 100 may read certain columns of the data cluster (e.g., columns 0-127 in the illustrative embodiment) in a single pass, without re-reads due to cluster edges or the modulo counter. Accordingly, the compute device 100 may provide maximum column read speeds for certain columns in a cluster while preserving row read/write speeds as described above.

Referring back to block 1232, if the logical column number is not less than the modulo limit, the method 1200 advances to block 1234, in which the compute device 100 determines an additional base address based on the block address and the logical column number. The additional base address identifies another row in the memory media 110 that includes the requested logical column number in physical column zero in the memory media 110. For example, the additional base address may be included in a column read block immediately before the requested block address. In the illustrative embodiment, the additional base address may be 1024 less than the base address determined above in connection with block 1222. In block 1236, the compute device 100 reads additional logical column data diagonally from the memory media 110 starting at the base address and using the modulo limit counter. The logical column data read in block 1224 and in the additional logical column data read in block 1236 may be assembled to form the requested logical column. Thus, the compute device 100 may read certain columns of the data cluster (e.g., columns 128-1023 in the illustrative embodiment) in two read operations, without additional re-reads due to the modulo counter. Accordingly, the compute device 100 may provide improved column read speeds for certain columns in the cluster, while preserving row read/write speeds for the entire cluster. After reading the logical column, the method 1200 loops back to block 1202 to perform additional memory access operations.

Figure 13:
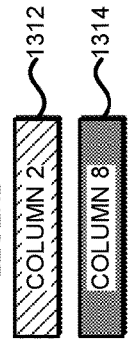
FIG. 13 is a schematic diagram illustrating a memory layout of clustered data that may be accessed with the method of FIG. 12.

Referring now to FIG. 13, diagram 1300 illustrates one potential embodiment of a column data format that may be accessed as described above in connection with the method of FIG. 12. The diagram 1300 illustrates a memory media 1302, for example the memory media 110 and/or the memory media 120 of FIG. 1. As shown, the illustrative memory media 1302 is arranged into a number of rows 1304 and tiles 1306 (i.e., columns 1306). Each of the tiles 1306 is included in a die 1308. Illustratively, each row 1304 is formed from four dies 1308 including four tiles 1306 for a total of 16 tiles 1306. However, in other embodiments, each row may include another number of dies 1308 and/or tiles 1306, such as eight dies of 128 tiles each, for a total of 1024 tiles. The illustrative memory media 1302 includes a single partition 1310; in other embodiments, the memory media 1302 may include a different number of partitions 1310, such as eight partitions. Each row 1304 is addressable by a row address, and each tile 1306 is addressable by a column number. Each die includes a preconfigured modulo limit, which is illustratively four. As described above, the modulo limit is equal to the width of each die 1308 in tiles 1306.

The illustrative memory media 1302 has stored therein a data cluster that is a logical matrix having 16 logical rows and 16 logical columns. As shown, the columns 1306 of each row 1304 are rotated by one column position for each subsequent row in a column sub-group across each die 1308. For example, logical row zero, logical column three is stored in row address zero, tile number three; and logical row one, logical column three is rotated and stored in row address one, tile number zero; and so on. Additionally, the column sub-groups are rotated across the partition 1310. For example a sub-block including logical rows 4-7 and logical columns 0-3 is rotated to tiles 4-7, a sub-block including logical rows 8-11 and logical columns 0-3 is rotated to tiles 8-11, and so on.

Each column of the data cluster may be read with no more than two column read operations. As an illustrative example, the diagram 1300 shows data included in logical column two as highlighted cells 1312. An illustrative column read of logical column two may start at row address two, tile zero in die zero. Using a shared command/address bus and per-die offsets, reads may be simultaneously performed at row address six, tile four in die one, row address 10, tile eight in die two, and row address 14, tile 12 in die three. After reading the current bit, each of the dies increments one or more internal counters subject to the modulo limit, and the column read continues at row address three, tile one in die zero; row address seven, tile five in die one; row address 11, tile nine in die two; and row address 15, tile 13 in die three. The dies increment internal counters, and due to the modulo limit of four, the row counter wraps around. Thus, the column read continues at row address zero, tile two in die zero; row address four, tile six in die one; row address eight, tile 10 in die two; and row address 12, tile 14 in die three. The dies increment internal counters, and the column read continues at row address one, tile three in die zero; row address five, tile seven in die one; row address 9, tile 11 in die two; and row address 13, tile 15 in die three. After reading data across all of the tiles in the partition 1310, the column read is completed, and the compute device has read all data from the logical column 1312 in a single pass. The compute device 100 may similarly read data from any of logical columns 0-3 (less than the modulo limit) in a single pass.

As another example, the diagram 1300 shows data included in logical column eight as highlighted cells 1314. An illustrative column read of logical column eight may start at row address eight, tile zero in die zero. Using a shared command/address bus and per-die offsets, reads may be simultaneously performed at row address 12, tile four in die one, row address 16, tile eight in die two, and row address 20, tile 12 in die three. However, row address 16 and 20 extend past the end of the data cluster and thus may be discarded by the compute device 100. After reading the current bit, each of the dies increments one or more internal counters subject to the modulo limit, and the column read continues at row address nine, tile one in die zero; and row address 13, tile five in die one. The dies increment internal counters, and the column read continues at row address 10, tile two in die zero; and row address 14, tile six in die one. The dies increment internal counters an additional time, and the column read continues at row address 11, tile three in die zero; and row address 15, tile seven in die one. The compute device 100 performs an additional column read starting at a row address eight positions before the block shown in FIG. 13 in die zero (e.g., address negative eight). Using a shared command/address bus and per-die offsets, reads may be simultaneously performed at row address negative four, tile four in die one, row address zero, tile eight in die two, and row address four, tile 12 in die three. Similar to the column read discussed above, row addresses negative eight and negative four extend past the beginning of the data cluster and thus may be discarded by the compute device 100. After reading the current bit, each of the dies increments one or more internal counters subject to the modulo limit, and the column read continues at row address one, tile nine in die two; and row address five, tile 13 in die three. The dies increment internal counters, and the column read continues at row address two, tile 10 in die two; and row address six, tile 14 in die three. The dies increment internal counters an additional time, and the column read continues at row address three, tile 11 in die two; and row address seven, tile 15 in die three. After performing the second column read operation the compute device has read all data from the logical column 1314 in two read operations. The compute device 100 may similarly read data from any of logical columns 4-15 (greater than or equal to the modulo limit) in two passes. Thus, the compute device 100 may provide improved column read performance by avoiding re-reading based on the modulo counter while preserving row read/write performance.

EXAMPLES

Illustrative examples of the technologies disclosed herein are provided below. An embodiment of the technologies may include any one or more, and any combination of, the examples described below.

Example 1 includes a device comprising: a column-addressable memory; and circuitry connected to the memory, wherein the circuitry is to: store a data cluster of a logical matrix in the column-addressable memory with a column-based format; and read a logical column of the data cluster from the column-addressable memory with a column read operation, wherein the column read operation is based on a block address and a column number.

Example 2 includes the subject matter of Example 1, and wherein to read the logical column comprises to: determine a base address as a function of the block address and the column number; and read logical column data diagonally from the column-addressable memory starting at the base address, wherein to read the logical column data comprises to read from the data cluster and from a duplicate copy of the data cluster.

Example 3 includes the subject matter of any of Examples 1 and 2, and wherein the circuitry is further to discard data from a row address not included in the data cluster or the duplicate copy of the data cluster.

Example 4 includes the subject matter of any of any of Examples 1-3, and wherein to store the data cluster comprises to: store the data cluster at a first row address in the column-addressable memory; and store the duplicate copy of the data cluster at a second row address in the column-addressable memory, wherein the first row address and the second row address are separated by a predetermined row offset.

Example 5 includes the subject matter of any of any of Examples 1-4, and wherein the circuitry is further to rotate each row of the data cluster across a partition of the column-addressable memory, wherein to store the data cluster comprises to store the data cluster in response to rotation of each row of the data cluster.

Example 6 includes the subject matter of any of Examples 1-5, and wherein the predetermined row offset comprises a column width of a partition of the column-addressable memory.

Example 7 includes the subject matter of any of Examples 1-6, and wherein to read the logical column comprises to:

read a plurality of complementary logical columns of the data cluster; and assemble the logical column in response to reading of the plurality of complementary logical columns.

Example 8 includes the subject matter of any of Examples 1-7, and wherein to read the plurality of complementary logical columns comprises to perform a column read operation for each of the complementary logical columns, wherein each column read operation has a different start address.

Example 9 includes the subject matter of any of Examples 1-8, and wherein to assemble the logical column comprises to assemble a multi-bit logical column based on the plurality of complementary logical columns.

Example 10 includes the subject matter of any of Examples 1-9, and wherein to store the data cluster comprises to: rotate each logical row of the data cluster across a partition of the column-addressable memory to generate a rotated row, wherein the partition comprises a plurality of dies of the column-addressable memory, wherein each die comprises a predetermined number of columns, and wherein each die is programmed with a predetermined row offset; and store each rotated row at a row address in the partition, wherein each die of the partition adds the associated predetermined row offset to the row address.

Example 11 includes the subject matter of any of Examples 1-10, and wherein to read the logical column comprises to: select a first partition of the column-addressable memory as a function of the column number, wherein the column-addressable memory comprises a plurality of partitions, wherein each partition comprises a plurality of dies of the column-addressable memory, and wherein each die comprises a predetermined number of columns; determine a base address as a function of the column number and a modulo limit of the column-addressable memory; and read logical column data diagonally from the column-addressable memory starting at the base address in the first partition.

Example 12 includes the subject matter of any of Examples 1-11, and wherein the modulo limit comprises the predetermined number of columns.

Example 13 includes the subject matter of any of Examples 1-12, and wherein to read the logical column data diagonally from the column-addressable memory starting at the base address comprises, for each die of the first partition, to: read a column at the base address plus a die offset associated with the corresponding die; and increment an internal address counter subject to the modulo limit.

Example 14 includes the subject matter of any of Examples 1-13, and wherein to store the data cluster comprises to: rotate each sub-group of logical columns within each logical row, wherein each sub-group of logical columns comprises the predetermined number of columns; determine a die number of the plurality of dies based on a row address of each logical row; and store each sub-group of logical columns of each logical row in a die having the die number determined for the logical row in a partition of the plurality of partitions selected based on a logical column number of the sub-group of logical columns.

Example 15 includes the subject matter of any of Examples 1-14, and wherein to read the logical column comprises to: determine a base address as a function of the column number and a modulo limit of the column-addressable memory, wherein the column-addressable memory comprises a plurality of dies, wherein each die comprises a predetermined number of columns, and wherein the modulo limit comprises the predetermined number of columns; and read logical column data diagonally from the column-addressable memory starting at the base address using the modulo limit.

Example 16 includes the subject matter of any of Examples 1-15, and wherein to read the logical column further comprises to: determine whether the column number is less than the modulo limit; determine an additional base address as a function of the column number and the modulo limit in response to a determination that the column number is not less than the modulo limit; and read logical column data diagonally from the column-addressable memory starting at the additional base address using the modulo limit.

Example 17 includes the subject matter of any of Examples 1-16, and wherein to read the logical column further comprises to assemble the logical column in response to reading of the logical column data diagonally starting at the base address and in response to reading of the logical column data diagonally starting at the additional base address.

Example 18 includes the subject matter of any of Examples 1-17, and wherein to store the data cluster comprises to: rotate each sub-group of logical columns within each logical row, wherein each sub-group of logical columns comprises the predetermined number of columns; rotate the sub-groups of the logical columns of each logical row across a partition of the column-addressable memory in response to rotation of each sub-group, wherein the partition comprises the plurality of dies; and store each logical row in response to rotation of the sub-groups of the logical columns.

Example 19 includes a method comprising: storing, by a compute device, a data cluster of a logical matrix in a column-addressable memory with a column-based format; and reading, by the compute device, a logical column of the data cluster from the column-addressable memory with a column read operation, wherein the column read operation is based on a block address and a column number.

Example 20 includes the subject matter of Example 19, and wherein reading the logical column comprises: determining a base address as a function of the block address and the column number; and reading logical column data diagonally from the column-addressable memory starting at the base address, wherein reading the logical column data comprises reading from the data cluster and from a duplicate copy of the data cluster.

Example 21 includes the subject matter of any of Examples 19 and 20, and further comprising discarding data from a row address not included in the data cluster or the duplicate copy of the data cluster.

Example 22 includes the subject matter of any of Examples 19-21, and wherein storing the data cluster comprises: storing the data cluster at a first row address in the column-addressable memory; and storing the duplicate copy of the data cluster at a second row address in the column-addressable memory, wherein the first row address and the second row address are separated by a predetermined row offset.

Example 23 includes the subject matter of any of Examples 19-22, and further comprising rotating each row of the data cluster across a partition of the column-addressable memory, wherein storing the data cluster comprises storing the data cluster in response to rotating each row of the data cluster.

Example 24 includes the subject matter of any of Examples 19-23, and wherein the predetermined row offset comprises a column width of a partition of the column-addressable memory.

Example 25 includes the subject matter of any of Examples 19-24, and wherein reading the logical column comprises: reading a plurality of complementary logical columns of the data cluster; and assembling the logical column in response to reading the plurality of complementary logical columns.

Example 26 includes the subject matter of any of Examples 19-25, and wherein reading the plurality of complementary logical columns comprises performing a column read operation for each of the complementary logical columns, wherein each column read operation has a different start address.

Example 27 includes the subject matter of any of Examples 19-26, and wherein assembling the logical column comprises assembling a multi-bit logical column based on the plurality of complementary logical columns.

Example 28 includes the subject matter of any of Examples 19-27, and wherein storing the data cluster comprises: rotating each logical row of the data cluster across a partition of the column-addressable memory to generate a rotated row, wherein the partition comprises a plurality of dies of the column-addressable memory, wherein each die comprises a predetermined number of columns, and wherein each die is programmed with a predetermined row offset; and storing each rotated row at a row address in the partition, wherein each die of the partition adds the associated predetermined row offset to the row address.

Example 29 includes the subject matter of any of Examples 19-28, and wherein reading the logical column comprises: selecting a first partition of the column-addressable memory as a function of the column number, wherein the column-addressable memory comprises a plurality of partitions, wherein each partition comprises a plurality of dies of the column-addressable memory, and wherein each die comprises a predetermined number of columns; determining a base address as a function of the column number and a modulo limit of the column-addressable memory; and reading logical column data diagonally from the column-addressable memory starting at the base address in the first partition.

Example 30 includes the subject matter of any of Examples 19-29, and wherein the modulo limit comprises the predetermined number of columns.

Example 31 includes the subject matter of any of Examples 19-30, and wherein reading the logical column data diagonally from the column-addressable memory starting at the base address comprises, for each die of the first partition: reading a column at the base address plus a die offset associated with the corresponding die; and incrementing an internal address counter subject to the modulo limit.

Example 32 includes the subject matter of any of Examples 19-31, and wherein storing the data cluster comprises: rotating each sub-group of logical columns within each logical row, wherein each sub-group of logical columns comprises the predetermined number of columns; determining a die number of the plurality of dies based on a row address of each logical row; and storing each sub-group of logical columns of each logical row in a die having the die number determined for the logical row in a partition of the plurality of partitions selected based on a logical column number of the sub-group of logical columns.

Example 33 includes the subject matter of any of Examples 19-32, and wherein reading the logical column comprises: determining a base address as a function of the column number and a modulo limit of the column-addressable memory, wherein the column-addressable memory comprises a plurality of dies, wherein each die comprises a predetermined number of columns, and wherein the modulo limit comprises the predetermined number of columns; and reading logical column data diagonally from the column-addressable memory starting at the base address using the modulo limit.

Example 34 includes the subject matter of any of Examples 19-33, and wherein reading the logical column further comprises: determining whether the column number is less than the modulo limit; determining an additional base address as a function of the column number and the modulo limit in response to determining that the column number is not less than the modulo limit; and reading logical column data diagonally from the column-addressable memory starting at the additional base address using the modulo limit.

Example 35 includes the subject matter of any of Examples 19-34, and wherein reading the logical column further comprises assembling the logical column in response to reading the logical column data diagonally starting at the base address and in response to reading the logical column data diagonally starting at the additional base address.

Example 36 includes the subject matter of any of Examples 19-35, and wherein storing the data cluster comprises: rotating each sub-group of logical columns within each logical row, wherein each sub-group of logical columns comprises the predetermined number of columns; rotating the sub-groups of the logical columns of each logical row across a partition of the column-addressable memory in response to rotating each sub-group, wherein the partition comprises the plurality of dies; and storing each logical row in response to rotating the sub-groups of the logical columns.

Example 37 includes a system comprising: a processor; a column-addressable memory; and circuitry connected to the memory, wherein the circuitry is to: store a data cluster of a logical matrix in the column-addressable memory with a column-based format; and read a logical column of the data cluster from the column-addressable memory with a column read operation, wherein the column read operation is based on a block address and a column number.

Example 38 includes the subject matter of Example 37, and wherein the circuitry is in a data storage device.

Example 39 includes the subject matter of any of Examples 37 and 38, and wherein the circuitry is in a memory device.

Example 40 includes the subject matter of any of Examples 37-39, and wherein to read the logical column comprises to: read a plurality of complementary logical columns of the data cluster; and assemble the logical column in response to reading of the plurality of complementary logical columns.

Example 41 includes the subject matter of any of Examples 37-40, and wherein to read the logical column comprises to: select a first partition of the column-addressable memory as a function of the column number, wherein the column-addressable memory comprises a plurality of partitions, wherein each partition comprises a plurality of dies of the column-addressable memory, and wherein each die comprises a predetermined number of columns; determine a base address as a function of the column number and a modulo limit of the column-addressable memory; and read logical column data diagonally from the column-addressable memory starting at the base address in the first partition.

Example 42 includes the subject matter of any of Examples 37-41, and wherein to read the logical column comprises to: determine a base address as a function of the column number and a modulo limit of the column-addressable memory, wherein the column-addressable memory comprises a plurality of dies, wherein each die comprises a predetermined number of columns, and wherein the modulo limit comprises the predetermined number of columns; and read logical column data diagonally from the column-addressable memory starting at the base address using the modulo limit.

Example 43 includes the subject matter of any of Examples 37-42, and wherein to store the data cluster comprises to: rotate each sub-group of logical columns within each logical row, wherein each sub-group of logical columns comprises the predetermined number of columns; rotate the sub-groups of the logical columns of each logical row across a partition of the column-addressable memory in response to rotation of each sub-group, wherein the partition comprises the plurality of dies; and store each logical row in response to rotation of the sub-groups of the logical columns.

The invention claimed is:

1. A device comprising:
a column-addressable memory; and
circuitry connected to the column-addressable memory, wherein the circuitry is to:
store a data cluster of a logical matrix in the column-addressable memory with a column-based format, and
read a logical column of the data cluster from the column-addressable memory with a column read operation based on a block address and a column number, wherein to read the logical column comprises to:
determine a base address as a function of the block address and the column number,
read logical column data diagonally from the column-addressable memory starting at the base address, and
read from the data cluster and from a duplicate copy of the data cluster.

2. The device of claim 1, wherein the circuitry is further to discard data from a row address not included in the data cluster or the duplicate copy of the data cluster.

3. The device of claim 1, wherein to store the data cluster comprises to:
store the data cluster at a first row address in the column-addressable memory; and
store the duplicate copy of the data cluster at a second row address in the column-addressable memory, wherein the first row address and the second row address are separated by a predetermined row offset.

4. The device of claim 3, wherein the circuitry is further to rotate each row of the data cluster across a partition of the column-addressable memory, wherein to store the data cluster comprises to store the data cluster in response to rotation of each row of the data cluster.

5. The device of claim 3, wherein the predetermined row offset comprises a column width of a partition of the column-addressable memory.

6. A device comprising,
a column-addressable memory; and
circuitry connected to the column-addressable memory, wherein the circuitry is to:
store a data cluster of a logical matrix in the column-addressable memory with a column read operation based on a block address and a column number, including to:
read a plurality of complementary logical columns of the data cluster, and
assemble the logical column in response to reading of the plurality of complementary logical columns.

7. The device of claim 6, wherein to read the plurality of complementary logical columns comprises to perform a column read operation for each of the complementary logical columns, wherein each column read operation has a different start address.

8. The device of claim 6, wherein to assemble the logical column comprises to assemble a multi-bit logical column based on the plurality of complementary logical columns.

9. The device of claim 6, wherein to store the data cluster comprises to:
rotate each logical row of the data cluster across a partition of the column-addressable memory to generate a rotated row, wherein the partition comprises a plurality of dies of the column-addressable memory, wherein each die comprises a predetermined number of columns, and wherein each die is programmed with a predetermined row offset; and
store each rotated row at a row address in the partition, wherein each die of the partition adds the predetermined row offset to the row address.

10. A device comprising,
a column-addressable memory; and
circuitry connected to the column-addressable memory, wherein the circuitry is to:
store a data cluster of a logical matrix in the column-addressable memory with a column-based format, and
read a logical column of the data cluster from the column-addressable memory with a column read operation based on a block address and a column number, including to:
select a first partition of the column-addressable memory as a function of the column number, wherein the column-addressable memory comprises a plurality of partitions, wherein each partition comprises a plurality of dies of the column-addressable memory, and wherein each die comprises a predetermined number of columns,
determine a base address as a function of the column number and a modulo limit of the column-addressable memory, and
read logical column data diagonally from the column-addressable memory starting at the base address in the first partition.

11. The device of claim 10, wherein the modulo limit comprises the predetermined number of columns.

12. The device of claim 10, wherein to read the logical column data diagonally from the column-addressable memory starting at the base address comprises, for each die of the first partition, to:
read a column at the base address plus a die offset associated with the die; and
increment an internal address counter subject to the modulo limit.

13. The device of claim 10, wherein to store the data cluster further comprises to:
rotate each sub-group of logical columns within each logical row, wherein each sub-group of logical columns comprises the predetermined number of columns;
determine a die number of the plurality of dies based on a row address of each logical row; and
store each sub-group of logical columns of each logical row in a die having the die number determined for the logical row in a partition of the plurality of partitions selected based on a logical column number of the sub-group of logical columns.

14. A device comprising,
a column-addressable memory; and
circuitry connected to the column-addressable memory, wherein the circuitry is to:
  store a data cluster of a logical matrix in the column-addressable memory with a column-based format, and
  read a logical column of the data cluster from the column-addressable memory with a column read operation based on a block address and a column number, including to:
  determine a base address as a function of the column number and a modulo limit of the column-addressable memory, wherein the column-addressable memory comprises a plurality of dies, wherein each die comprises a predetermined number of columns, and wherein the modulo limit comprises the predetermined number of columns; and
  read logical column data diagonally from the column-addressable memory starting at the base address using the modulo limit.

15. The device of claim 14, wherein to read the logical column further comprises to:
  determine whether the column number is less than the modulo limit;
  determine an additional base address as a function of the column number and the modulo limit in response to a determination that the column number is not less than the modulo limit; and
  read logical column data diagonally from the column-addressable memory starting at the additional base address using the modulo limit.

16. The device of claim 15, wherein to read the logical column further comprises to assemble the logical column in response to reading of the logical column data diagonally starting at the base address and in response to reading of the logical column data diagonally starting at the additional base address.

17. The device of claim 14, wherein to store the data cluster further comprises to:
  rotate each sub-group of logical columns within each logical row, wherein each sub-group of logical columns comprises the predetermined number of columns;
  rotate the sub-groups of the logical columns of each logical row across a partition of the column-addressable memory in response to rotation of each sub-group, wherein the partition comprises the plurality of dies; and
  store each logical row in response to rotation of the sub-groups of the logical columns.

18. A system comprising:
a processor;
a column-addressable memory; and
circuitry connected to the column-addressable memory, wherein the circuitry is to:
  store a data cluster of a logical matrix in the column-addressable memory with a column-based format, and
  read a logical column of the data cluster from the column-addressable memory with a column read operation based on a block address and a column number, wherein to read the logical column comprises to:
  determine a base address as a function of the block address and the column number,
  read logical column data diagonally from the column-addressable memory starting at the base address, and
  read from the data cluster and from a duplicate copy of the data cluster.

19. The system of claim 18, wherein the circuitry is in a data storage device.

20. The system of claim 18, wherein the circuitry is in a memory device.

21. A system comprising,
a processor;
a column-addressable memory; and
circuitry connected to the column-addressable memory, wherein the circuitry is to:
  store a data cluster of a logical matrix in the column-addressable memory with a column-based format, and
  read a logical column of the data cluster from the column-addressable memory with a column read operation based on a block address and a column number, including to:
  read a plurality of complementary logical columns of the data cluster, and
  assemble the logical column in response to reading of the plurality of complementary logical columns.

22. The system of claim 18, wherein to read the logical column further comprises to:
  select a first partition of the column-addressable memory as a function of the column number, wherein the column-addressable memory comprises a plurality of partitions, wherein each partition comprises a plurality of dies of the column-addressable memory, and wherein each die comprises a predetermined number of columns;
  determine the base address as the function of the column number and a modulo limit of the column-addressable memory; and
  read the logical column data diagonally from the column-addressable memory starting at the base address in the first partition.

23. The system of claim 22, wherein:
the modulo limit comprises the predetermined number of columns; and
to read the logical column data diagonally from the column-addressable memory starting at the base address using the modulo limit.

24. The system of claim 23, wherein to store the data cluster comprises to:
  rotate each sub-group of logical columns within each logical row, wherein each sub-group of logical columns comprises the predetermined number of columns;
  rotate the sub-groups of the logical columns of each logical row across a partition of the column-addressable memory in response to rotation of each sub-group, wherein the partition comprises the plurality of dies; and
  store each logical row in response to rotation of the sub-groups of the logical columns.

* * * * *

UNITED STATES PATENT AND TRADEMARK OFFICE
CERTIFICATE OF CORRECTION

PATENT NO. : 11,327,881 B2
APPLICATION NO. : 15/930889
DATED : May 10, 2022
INVENTOR(S) : Chetan Chauhan et al.

It is certified that error appears in the above-identified patent and that said Letters Patent is hereby corrected as shown below:

In the Claims

Amend Claim 6 to read:
A device comprising,
    a column-addressable memory; and
    circuitry connected to the column-addressable memory, wherein the circuitry is to:
        store a data cluster of a logical matrix in the column-addressable memory with a column-based format, and
        read a logical column of the data cluster from the column-addressable memory with a column read operation based on a block address and a column number, including to:
            read a plurality of complementary logical columns of the data cluster, and
            assemble the logical column in response to reading of the plurality of complementary logical columns.

Signed and Sealed this
Twenty-second Day of November, 2022

Katherine Kelly Vidal
*Director of the United States Patent and Trademark Office*